(12) United States Patent
Nulwala et al.

(10) Patent No.: US 10,300,438 B2
(45) Date of Patent: May 28, 2019

(54) IONIC CROSS-LINKED POLYMERIC FILMS FOR GAS SEPARATION

(71) Applicant: CARNEGIE MELLON UNIVERSITY, Pittsburgh, PA (US)

(72) Inventors: Hunaid B. Nulwala, Pittsburgh, PA (US); David Luebke, Pittsburgh, PA (US); Xu Zhou, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 64 days.

(21) Appl. No.: 15/520,962

(22) PCT Filed: Oct. 28, 2015

(86) PCT No.: PCT/US2015/057769
§ 371 (c)(1),
(2) Date: Apr. 21, 2017

(87) PCT Pub. No.: WO2016/069722
PCT Pub. Date: May 6, 2016

(65) Prior Publication Data
US 2018/0021742 A1    Jan. 25, 2018

Related U.S. Application Data

(60) Provisional application No. 62/122,728, filed on Oct. 28, 2014.

(51) Int. Cl.
*B01D 53/22* (2006.01)
*B01D 67/00* (2006.01)
(Continued)

(52) U.S. Cl.
CPC .......... *B01D 71/76* (2013.01); *B01D 53/228* (2013.01); *B01D 67/0006* (2013.01);
(Continued)

(58) Field of Classification Search
CPC .. B01D 53/22; B01D 53/228; B01D 67/0006; B01D 69/02; B01D 69/12; B01D 69/125;
(Continued)

(56) References Cited

U.S. PATENT DOCUMENTS 8,124,701 B2 *  2/2012  Craciun .............. C07D 249/04
                                                         526/258
8,545,606 B2   10/2013  Koros et al.
(Continued)

OTHER PUBLICATIONS

Obadia, Mona M. et al., "Reprocessing and Recycling of Highly Cross-Linked Ion-Conducting Networks through Transalkylation Exchanges of C-N bonds", Journal of the American Chemical Society, vol. 137, Apr. 2015, pp. 6078-6083. (Year: 2015).*
(Continued)

*Primary Examiner* — Jason M Greene
(74) *Attorney, Agent, or Firm* — The Webb Law Firm

(57) ABSTRACT

Provided herein are compositions, $CO_2$-permeable/selective membranes and related methods of making and using the membranes. Ionically cross-linked poly(ether)-based membranes were prepared for applications relating to $CO_2$. These films were studied for their thermal curing behavior using DSC. The resulting free-standing membranes have $T_g$s near −64° C., $T_dS$ up to 230° C., and Young's modulus up to 4.2 MPa. These membranes showed $CO_2$ permeabilities of 84-110 Barrer and $CO_2/N_2$ selectivity of 20-40.

23 Claims, 12 Drawing Sheets

(51) Int. Cl.
| | |
|---|---|
| *B01D 69/02* | (2006.01) |
| *B01D 69/12* | (2006.01) |
| *B01D 71/52* | (2006.01) |
| *B01D 71/62* | (2006.01) |
| *B01D 71/76* | (2006.01) |
| *B01J 41/13* | (2017.01) |
| *C08G 73/08* | (2006.01) |

(52) U.S. Cl.
CPC .......... *B01D 69/02* (2013.01); *B01D 69/125* (2013.01); *B01D 71/52* (2013.01); *B01D 71/62* (2013.01); *B01J 41/13* (2017.01); *C08G 73/08* (2013.01); *B01D 53/22* (2013.01); *B01D 69/12* (2013.01); *B01D 2257/504* (2013.01); *B01D 2258/0283* (2013.01); *B01D 2323/30* (2013.01); *B01D 2323/40* (2013.01); *B01D 2325/20* (2013.01); *Y02C 10/10* (2013.01)

(58) Field of Classification Search
CPC ........ B01D 71/52; B01D 71/62; B01D 71/76; B01D 2323/30; B01D 2323/40; C08G 73/08; B01J 41/13
See application file for complete search history.

(56) References Cited

U.S. PATENT DOCUMENTS

| | | | |
|---|---|---|---|
| 2006/0154129 A1* | 7/2006 | Li | C08G 73/08 429/493 |
| 2007/0151447 A1 | 7/2007 | Merkel | |
| 2009/0220607 A1* | 9/2009 | Kiser | C08G 73/08 514/1.1 |
| 2009/0249950 A1 | 10/2009 | Koros et al. | |
| 2013/0225401 A1 | 8/2013 | Shen et al. | |

OTHER PUBLICATIONS

Yan, Fangyong et al., "Understanding the effect of side groups in ionic liquids on carbon-capture properties: a combined experimental and theoretical effort", Phys. Chem. Chem. Phys., 2013, vol. 15, pp. 3264-3272. (Year: 2013).*
Bara et al., "Synthesis and Performance of Polymerizable Room-Temperature Ionic Liquids as Gas Separation Membranes", Ind. Eng. Chem. Res., 2007, pp. 5397-5404, vol. 46.
Bara et al., "Synthesis and light gas separations in cross-linked gemini room temperature ionic liquid polymer membranes", Journal of Membrane Science, 2008, pp. 186-191, vol. 316.
Besset et al., "Copper-Catalyzed vs Thermal Step Growth Polymerization of Starch-Derived α-Azide--ω-Alkyne Dianhydrohexitol Stereoisomers: To Click or Not to Click?", Macromolecules, 2010, pp. 17-19, vol. 43.
Binauld et al., "A Modular Approach to Functionalized and Expanded Crown Ether Based Macrocycles Using Click Chemistry", Angew. Chem. Int. Ed., 2009, pp. 6654-6658, vol. 48.
Binauld et al., "Solving the Loss of Orthogonality During the Polyaddition of α-Azide-ω-Alkyne Monomers Catalyzed by Cu(PPh3)3Br: Application to the Synthesis of High-Molar Mass Polytriazoles", Journal of Polymer Science: Part A: Polymer Chemistry, 2010, pp. 2470-2476, vol. 48.
Bondar et al., "Gas Transport Properties of Poly(ether-b-amide) Segmented Block Copolymers", Journal of Polymer Science: Part B: Polymer Physics, 2000, pp. 2051-2062, vol. 38.
Carlisle et al., "Main-chain imidazolium polymer membranes for $CO_2$ separations: An initial study of a new ionic liquid-inspired platform", Journal of Membrane Science, 2010, pp. 37-43, vol. 359.
Denissen et al., "Vitrimers: permanent organic networks with glass-like fluidity", Chemical Science, 2015, 9 pages.
Goswami et al., "Efficient synthesis of diverse heterobifunctionalized clickable oligo(ethylene glycol) linkers: potential applications in bioconjugation and targeted drug delivery", Org. Biomol. Chem., 2013, pp. 1116-1126, vol. 11.
Hirayama et al., "Permeation properties to $CO_2$ and $N_2$ of poly(ethylene oxide)-containing and crosslinked polymer films", Journal of Membrane Science, 1999, pp. 87-99, vol. 160.
Kissinger, "Reaction Kinetics in Differential Thermal Analysis", Analytical Chemistry, Nov. 1957, pp. 1702-1706, vol. 29:11.
Kusuma et al., "Influence of Tris-based co-monomer on structure and gas transport properties of cross-linked poly (ethylene oxide)", Journal of Membrane Science, 2010, pp. 25-36, vol. 359.
Li et al., "High performance membranes based on ionic liquid polymers for $CO_2$ separation from the flue gas", Green Chem., 2012, pp. 1052-1063, vol. 14.
Lie et al., "Optimization of a membrane process for $CO_2$ capture in the steelmaking industry", International Journal of Greenhouse Gas Control, 2007, pp. 309-317, vol. I.
Lim et al., "Effect of polyether diamine on gas permeation properties of organic-inorganic hybrid membranes", J Sol-Gel Sci Techn, 2007, pp. 35-40, vol. 43.
Lin et al., "Gas and Vapor Solubility in Cross-Linked Poly(ethylene Glycol Diacrylate)", Macromolecules, 2005, pp. 8394-8407, vol. 38.
Lin et al., "Transport and structural characteristics of crosslinked poly(ethylene oxide) rubbers", Journal of Membrane Science, 2006, pp. 145-161, vol. 276.
Liu et al., "Recent progress in the design of advanced PEO-containing membranes for $CO_2$ removal", Progress in Polymer Science, 2013, pp. 1089-1120, vol. 38.
Mudraboyina et al., "1,2,3-Triazolium-Based Poly(ionic liquid)s with Enhanced Ion Conducting Properties Obtained through a Click Chemistry Polyaddition Strategy", Chem. Mater., 2014, pp. 1720-1726, vol. 26.
Obadia et al., "Accelerated Solvent- and Catalyst-Free Synthesis of 1,2,3-Triazolium-Based Poly(Ionic Liquid)s", Macromol. Rapid Commun., 2014, pp. 794-800, vol. 35.
Obadia et al., "Reprocessing and Recycling of Highly Cross-Linked Ion-Conducting Networks through Transalkylation Exchanges of C—N. Bonds", J. Am. Chem. Soc., 2015, pp. 6078-6083, vol. 137.
Okamoto et al., "Selective Permeation of Carbon Dioxide over Nitrogen through Polyethyleneoxide-Containing Polyimide Membranes", Chemistry Letters, 1993, pp. 225-228.
Okamoto et al., "Gas Permeation Properties of Poly(ether imide) Segmented Copolymers", Macromolecules, 1995, pp. 6950-6956, vol. 28.
Sforca et al., "Organic-inorganic membranes prepared from polyether diamine and epoxy silane", Journal of Membrane Science, 1999, pp. 197-207, vol. 159.
Sun et al., "Carbohydrate and Protein Immobilization onto Solid Surfaces by Sequential Diels-Alder and Azide-Alkyne Cycloadditions", Bioconjugate Chem., 2006, pp. 52-57, vol. 17.
Tome et al., "Pyrrolidinium-based polymeric ionic liquid materials: New perspectives for $CO_2$ separation membranes", Journal of Membrane Science, 2013, pp. 260-266, vol. 428.
Yan et al., "Understanding the effect of side groups in ionic liquids on carbon-capture properties: a combined experimental and theoretical effort", Phys. Chem. Chem. Phys., 2013, pp. 3264-3272, vol. 15.

* cited by examiner a= 2-20 can be linear or branched
m=2-100
n=2-8
o=2-6
y= H, linear and branched hydrocarbon at position y.
X= I-, Br-, Cl-, Ms, Ts, Triflate, Tf2N, carnonate, anhydride, sulfonic acid, carboxylic acid
--= branched alkyl, linear alkyl, aryl with aklyl end groups, PDMS oligomers, Short chain polyethylene glycol.

IONIC CROSS-LINKED POLYMERIC FILMS FOR GAS SEPARATION

CROSS REFERENCE TO RELATED APPLICATIONS

This application is a National Stage of International Application No. PCT/US2015/057769. filed Oct. 28. 2015, which claims the benefit of U.S. Provisional Patent Application No. 62/122,728, filed Oct. 28, 2014, each of which is incorporated herein by reference in its entirety.

STATEMENT REGARDING FEDERAL FUNDING

This invention was made with government support under the Department of Energy DE-FE0004000. The government has certain rights in this invention.

Provided herein are compositions and devices for use in gas separation as well as methods of making and using the compositions and devices.

Membrane technology is a promising method for $CO_2$ separation because of the absence of regeneration process, small footprint, and low capital cost. However, challenges still remain in designing membranes with good mechanical properties, excellent $CO_2$ permeability and selectivity, ease of preparation, and low cost. Poly(ethylene glycol) (PEG) based polymeric membranes have been intensively investigated for $CO_2$ separation. They are known to have high affinity towards $CO_2$ due to the ether characteristics, but suffer from high crystallinity and weak mechanical strength (Liu, S. L., et al., *Prog. Polym. Sci.* 2013, 38, 1089-1120).

Poly(ionic liquid)s (PILs) membrane is a new class of materials for $CO_2$ separation. The IL moieties in PIL membranes provide good $CO_2$ selectivity. However, low $CO_2$ permeabilities of these PILs are still major challenges to overcome when creating new materials for this purpose.

Triazoles are an effective stitching methodology for making polymers with certain functionality incorporated in the polymer. Triazoles can be converted into triazolium-based materials with simple addition of quaternizing species. Recent literature reported a one-step thermal polyaddition of azide and propargyl-functionalized monomer in the presence of quaternizing agent. (Obadia, M. M., et al., *Macromol. Rapid Commun.* 2014, 35, 794-800 and Obadia M. M., et al., *J. Am. Chem. Soc.* 2015, 137, 6078-6083). This solvent- and catalyst-free method was used herein to produce 1,2,3-triazolium-based polymers with comparable properties to their analogs prepared from multistep synthetic method (Obadia, M. M., et al., *Macromol. Rapid Commun.* 2014, 35, 794-800; Mudraboyina, B. P., et al., *Chem. Mater.* 2014, 26, 1720-1726; Binauld, S., et al., *Angew. Chem. Int. Ed. Engl.* 2009, 48, 6654-6658; and Binauld, S., et al., *J. Polym. Sci. Part A Polym. Chem.* 2010, 48, 2470-2476).

SUMMARY

Provided herein is a method to prepare an ether-containing, mechanically strong, polymeric material and membrane with good $CO_2$ transport and permeability properties. The polymeric materials and membranes described herein are useful in gas separation, as well as for use as an ion-conducting network, for example for use in supercapacitors, batteries, and fuel cells. In one example, cross-linked membranes were designed with a flexible backbone which combined the features of both PILs and an ether-containing moiety for high $CO_2$ selectivity. As an example, poly(trimethylene ether)glycol (PTMEG) is a commercially-available starting material derived from renewable sources. It is hydrophobic when compared to PEG. The hydroxyl end groups of poly(trimethylene ether)glycol (PTMEG) were converted into azide and propargyl groups, respectively. Taking advantage of the one-step thermal reaction, a dihalide quaternizing agent was incorporated, which served as a crosslinker, to fabricate ionically cross-linked PTMEG-based polymer films. Benefits of these methods, compositions and devices include a solvent- and catalyst-free strategy which allows fabrication of cross-linked triazolium membrane directly from functionalized oligomers. The membrane fabrication is non-sensitive and can be performed under oxygen condition. Moreover, membrane properties can be tailored by changing the functionality of polymer backbones, crosslinking density, and counter anions.

BRIEF DESCRIPTION OF THE DRAWINGS

FIG. 4B is a cross-section of FIG. 4A at "A". FIG. 4D is a cross-section of FIG. 4C at "A".

DETAILED DESCRIPTION

Figure 1A:
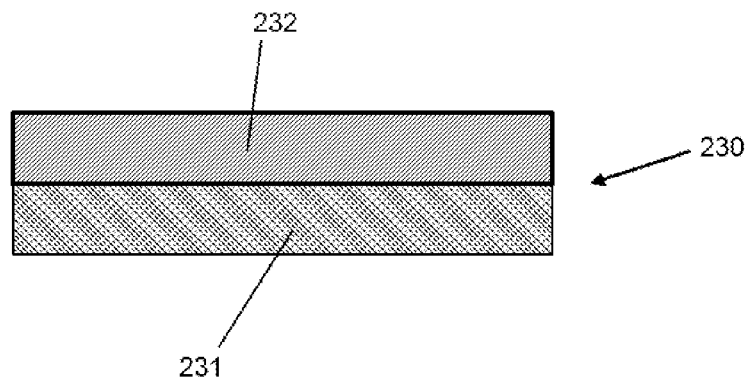
FIGS. 1A-C depict various aspects of a membrane structure as disclosed herein.

Other than in the operating examples, or where otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

For definitions provided herein, those definitions refer to word forms, cognates and grammatical variants of those words or phrases.

As used herein, the term "polymer composition" is a composition comprising one or more polymers. As a class, "polymers" includes, without limitation, homopolymers, heteropolymers, co-polymers, block polymers, block co-polymers and can be both natural and synthetic. Homopolymers contain one type of building block, or monomer, whereas co-polymers contain more than one type of monomer.

A polymer "comprises" or is "derived from" a stated monomer if that monomer is incorporated into the polymer. Thus, the incorporated monomer that the polymer comprises is not the same as the monomer prior to incorporation into the polymer, in that at the very least, during incorporation of the monomer, certain groups, e.g. terminal groups, that are modified during polymerization are changed, removed, and/ or relocated, and certain bonds may be added, removed, and/or modified. An incorporated monomer is referred to as a "residue" of that monomer. A polymer is said to comprise a specific type of linkage if that linkage is present in the polymer. Unless otherwise specified, molecular weight for polymer compositions refers to weight average molecular weight ($M_W$). To the contrary, specifically-defined compounds, such as 1,10-diiododecane, have a defined molecular weight, and are not described in terms of a distribution of molecular weights. As an example, the molecular weight of poly(trimethylene glycol), having an average of 11 trimethylene glycol residues, is expressed in terms of $M_W$. A "moiety" is a portion of a molecule, and a residue or group of residues, such as an 11-mer chain of trimethylene glycol residues, or a triazole group within a larger polymer, for example as described below.

"Alkyl" refers to straight, branched chain, or cyclic hydrocarbon groups including from 1 to about 20 carbon atoms, for example and without limitation $C_{1-3}$, $C_{1-6}$, $C_{1-10}$ groups, for example and without limitation, straight, branched chain alkyl groups such as methyl, ethyl, propyl, butyl, pentyl, hexyl, heptyl, octyl, nonyl, decyl, undecyl, dodecyl, and the like. "Substituted alkyl" refers to alkyl substituted at 1 or more, e.g., 1, 2, 3, 4, 5, or even 6 positions, which substituents are attached at any available atom to produce a stable compound, with substitution as described herein. "Optionally substituted alkyl" refers to alkyl or substituted alkyl. "Halogen," "halide," and "halo" refers to —F, —Cl, —Br, and/or —I. "Hydrocarbon" refers to a compound, group or moiety solely consisting of C and H atoms.

"Alkylene" and "substituted alkylene" refer to divalent alkyl and divalent substituted alkyl, respectively, including, without limitation, ethylene (—CH$_2$—CH$_2$—). "Optionally substituted alkylene" refers to alkylene or substituted alkylene. A polyether is a polymer comprising a plurality of ether groups, such as poly(alkylene oxides), comprising the moiety —[O—R—]n, in which n is an integer of from 2 to 100 or greater, for example 2 to 100, or 5-20, or from 2 to any integer less than 25. As would be recognized for polyethers, as with any polymer composition referenced herein, n, or like references, is calculated in reference to a polydisperse population of molecules, with n being representative of the average number of units of a referenced moiety, determined by reference to the $M_W$ of the polyether or polymer composition. The population of molecules has a dispersity (dipersity, calculated by dividing the weight average molecular weight by the number average molecular weight) within tolerances acceptable for production of a composition as described herein, for example for gas-separation purposes.

"Aryl," alone or in combination refers to an aromatic monocyclic or bicyclic ring system such as phenyl or naphthyl. "Aryl" also includes aromatic ring systems that are optionally fused with a cycloalkyl ring. A "substituted aryl" is an aryl that is independently substituted with one or more substituents attached at any available atom to produce a stable compound, wherein the substituents are as described herein. "Optionally substituted aryl" refers to aryl or substituted aryl. "Arylene" denotes divalent aryl, and "substituted arylene" refers to divalent substituted aryl. "Optionally substituted arylene" refers to arylene or substituted arylene. As used herein, a "phenol" group is hydroxyphenyl, for example a peptide backbone comprising a hydroxyphenyl group.

A method of manufacturing a copolymer is provided herein. The method is a Huisgen cycloaddition-type reaction in which azide and alkyne groups join, by heating and optionally in the presence of a copper (e.g., Cu(I)) catalyst to form a population of triazole 1,4-adducts and 1,5 adducts. The reaction of the triazole with a quaternizing group yields a triazolium group. The method comprises reacting a polyether monomer terminated in propargyl groups, e.g. C≡C—R—C≡C, with a polyether monomer terminated in azide groups, —N$_3$, e.g., N$_3$—R'—N$_3$, where R and R' comprise, or are, polyether moieties, and are the same or different, in the presence of a crosslinker comprising one or more quaternizing groups, thereby producing a polyether comprising a poly(triazolium) ionic copolymer composition. The use of separated di-triazyl and di-propargyl monomers, has the added benefit over using a single monomer terminated at one end with an azyl group and at another end with a propargyl group of permitting use of two or more different monomer structures.

A "polyether" useful in the propargyl-terminated and azide-terminated monomers described above may be any poly(alkylene glycol), and in one aspect, a poly($C_2$-$C_6$ alkylene glycol), having the structure —[R1-O]$_n$—, where R1 is linear or branched alkylene, such as a $C_2$-$C_8$ alkylene, or mixtures of two or more different alkylenes, such as $C_2$-$C_8$ alkylenes. n can vary, depending on the ultimate use of the composition, for example from 2 to 100, from 2 to 50, from 2 to 25, from 5 to 20, or from 8 to 15. In one aspect, the polyether moiety is Formula (I):

in which n is 2-8; m is 2-100; and each instance of y is, independently, H, linear alkyl or branched hydrocarbon, e.g., alkyl. In one aspect n is 2-6, m is 5-20 and/or each instance of y is, independently, H, linear $C_2$-$C_6$ alkyl or branched $C_2$-$C_6$ alkyl.

Figure 5:
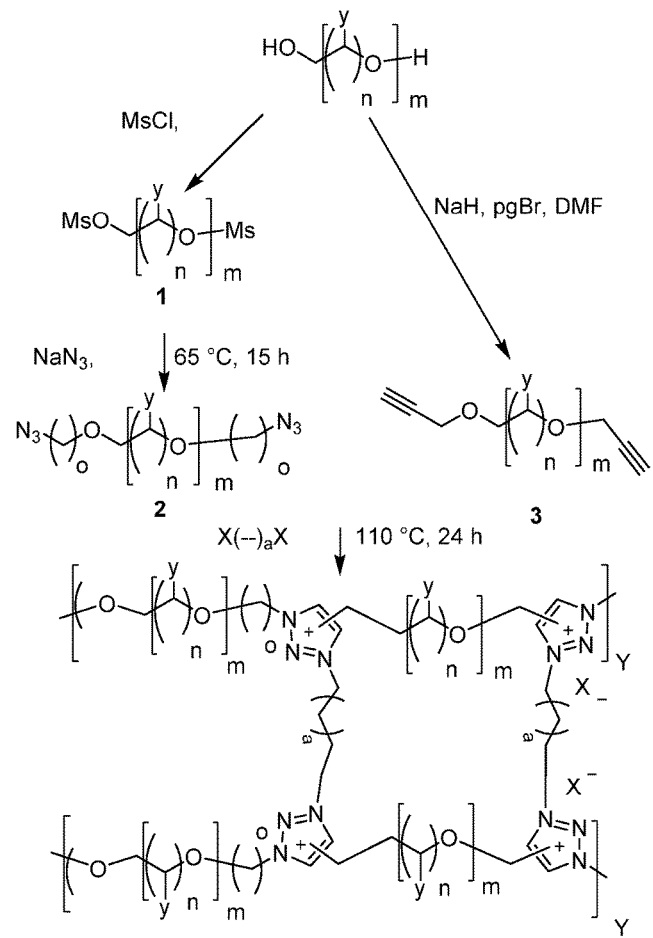
FIG. 5 shows Scheme 1: a generalized schematic of the preparation of cross-linked polytriazolium membrane (Polymer 4a-c).

The number of poly(alkylene glycol) moieties for each of the propargyl-terminated and azide-terminated monomers may be the same or different, and the dispersity of the monomers may be low or high (that is, for each of the propargyl-terminated and azide-terminated monomers, n might be a single, low-dispersity value (e.g., monodisperse or uniform) or high-dispersity (non-uniform, e.g., having a range of values). Examples of linear or branched alkylenes, such as $C_2$-$C_8$ alkylenes include any divalent ethylene or linear or branched propylene, butylene, pentylene and hexylene moieties, such as n-propyl, n-butyl, isobutyl, t-butyl, n-pentyl, branched pentyl, n-hexyl, septyl, or octyl, and/or branched hexyl, septyl, or octyl moieties. In one aspect, the $C_2$-$C_8$ alkylene is linear, for example, selected from ethyl, trimethylene (n-propyl), and tetramethylene (n-butyl). A poly(alkylene glycol) can be a homopolymer, including a single type of alkylene glycol moieties, or a copolymer including two or more different alkylene glycol moieties. Propargyl-terminated monomers and azide-terminated monomers can be prepared by any useful method, for example from commercially-available —OH-terminated poly(alkylene glycol) as described below and as shown in FIG. 5.

The cross-linkers are alkyl, aryl, polyether or polysiloxane moieties, in one aspect comprise or consist of $C_5$ to $C_{20}$ alkyl, $C_5$ to $C_{20}$ aryl, poly($C_2$-$C_8$ alkylene glycol) with from 1 to 20 ($C_2$-$C_8$ alkylene glycol) residues, or $Si_2$-$Si_{20}$ poly (di-$C_1$-$C_8$ alkyl siloxane) ($Si_2$-$Si_{20}$ indicating that the siloxane moiety has from 2 to 20 silicon atoms), having one or more, e.g., 1, 2, 3, 4, or 5 quaternizing groups, and typically comprise a methylene group immediately adjacent to the quaternizing group, e.g. —$CH_2$—X where X is the quaternizing group (see, e.g., Scheme 1). In one aspect, the quaternizing groups are halo groups, such as chloride, bromide and iodide leaving groups, e.g., iodine as indicated below. Other quaternizing groups include sulfonate esters, such as mesylate ($CH_3SO_3$), tosylate (p-toluenesulfonate), triflate ($CF_3SO_3$), carboxyl, sulfonyl, anhydride, and dicarbonate groups. Cross-linking the polyether with the cross-linker, results in an ionic polymer composition that forms a salt with the leaving group. A "quaternizing group" is an atom or a group of atoms that is a good leaving group such that a quaternary tetrazolium group is formed upon polymerization of the compositions described herein.

The counterions produced by the quaternization of the triazole can be exchanged for other counterions by any useful methodology, such as by metathesis. To exchange the counterions, the ionic polymer composition is swelled in a suitable polar solvent and washed one or more times with a suitable solution comprising a salt of the counterion—to replace that of the ionic copolymer. Suitable solvents include water, methanol, acetonitrile, dimethylformamide (DMF), hexamethylphosphoramide (HMPA), dimethylsulfide (DMS), dimethylsulfoxide (DMSO), methylpyrrolidone, etc. Suitable counterions include $OH^-$, phosphate, hexafluoroantimonate, perchlorate, bis[(trifluoromethyl)sulfonyl]amide, nitrite, nitrate, sulfate, carboxylate, sulfonate, sulfonamide, phosphonate, halide, bis(trifluoromethylsulfonyl)imide, bis(methanesulfonyl)imide, dictanimide, alkylsulfate, alkylsulfonates, saccharinate, triflate acetate, gluconate, docusate, methylsulfate, trifluoroacetate, mono- or diperfluorosulfonate, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$ and amino acid anions.

The propargyl-terminated monomer, the azide-terminated monomer, and the crosslinker are combined in appropriate ratios in a reaction mixture. The propargyl-terminated monomer, the azide-terminated monomer, and the crosslinker are polymerized in the reaction mixture at a temperature in the range of from 50° C. to 170° C., such as at 110° C., for a suitable time period to allow the polymerization and crosslinking reaction to proceed to completion, for example from four to 72 hours, for example 12 or 24 hours. At lower temperatures in this range, e.g. less than 100° C., copper (e.g., Cu(I)) may be used to catalyze the reaction.

To produce polyether chains of sufficient length, the molar ratio of the propargyl-terminated monomer and the azide-terminated monomer is equal, or approximately or essentially equal—that is, at a 1:1 molar ratio. Deviation from the 1:1 ratio is acceptable, so long as the resulting composition meets determined tolerances for the final material. Also, it may be desirable to alter the ratio slightly, e.g., ranging from a 1:2 to a 2:1 ratio, in order to change the physical qualities of the final product, though deviation of no more than 1%, 5%, 10%, or 20% from a 1:1 ratio is preferred in one aspect. The propargyl-terminated monomer, the azide-terminated monomer, and the crosslinker are present in a molar ratio of propargyl-terminated monomer:azide-terminated monomer: crosslinker from 1:1:0.5 to 1:1:2, and in one aspect 1:1:1.

An ionic polymer composition is provided, comprising polyether moieties as described above for the propargyl-terminated monomer and the azide-terminated monomer, such as poly($C_2$-$C_8$ alkylene glycol)-containing moieties comprising from 2 to 100, e.g. 5 to 20, contiguous (not interrupted) alkylene glycol residues, covalently attached to triazolium moieties, and a crosslinker attached to one or more of the triazolium moieties, the crosslinker comprising or consisting of a $C_5$ to $C_{20}$ alkyl, $C_5$ to $C_{20}$ aryl, poly($C_2$-$C_8$ alkylene glycol) with from 1 to 20 ($C_2$-$C_8$ alkylene glycol) residues, or $Si_2$-$Si_{20}$ poly(di-$C_1$-$C_8$ alkyl siloxane) moiety, optionally attached to the triazolium moiety by a $CH_2$. The poly(alkylene glycol) moieties, the triazolium moieties and the crosslinker are present in a molar ratio of poly(alkylene glycol) moieties:triazolium moieties:crosslinker from 1:1: 0.5 to 1:1:2, and in one aspect 1:1:1.

In one embodiment, the ionic polymer composition comprises Formula (II):

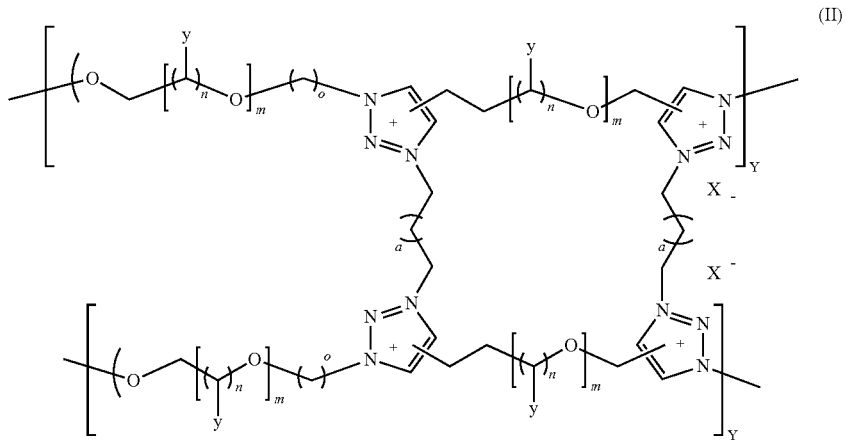

in which:
a comprises or consists of $C_5$ to $C_{20}$ alkyl, $C_5$ to $C_{20}$ aryl, poly($C_2$-$C_8$ alkylene glycol), such as poly(ethylene glycol), with from 1 to 20 ($C_2$-$C_8$ alkylene glycol) residues, or $Si_2$-$Si_{20}$ poly(di-$C_1$-$C_8$ alkyl siloxane);
n is 2-8;
m is 2-100;
o is $C_2$-$C_6$ alkylene;
each instance of y is, independently, H, linear alkyl or branched hydrocarbon, e.g., alkyl; and
X$^-$ is an anion, optionally selected from chloride, bromide and iodide, tetrafluoroborate ($BF_4^-$), hexafluorophosphate ($PF_6^-$), bis(trifluoromethylsulfonyl) imide (Tf2N$^-$), and sulfonate ester ions, such as mesylate ($CH_3SO_3^-$), tosylate (p-toluenesulfonate), triflate ($CF_3SO_3$), carboxyl, sulfonyl, anhydride, dicarbonate, OH$^-$, phosphate, hexafluoroantimonate, perchlorate, bis[(trifluoromethyl)sulfonyl]amide, nitrite, nitrate, sulfate, carboxylate, sulfonate, sulfonamide, phosphonate, halide, bis(trifluoromethylsulfonyl)imide, bis (methanesulfonyl)imide, dictanimide, alkylsulfate, alkylsulfonates, saccharinate, triflate acetate, gluconate, docusate, methylsulfate, trifluoroacetate, mono- or diperfluorosulfonate, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$ and amino acid anions.

In one aspect n is 2-6, m is 2-100, e.g., 5-20, o is 1, and each instance of y is, independently, H, linear $C_2$-$C_6$ alkyl or branched $C_2$-$C_6$ alkyl.

In another aspect a membrane is provided, comprising the ionic polymer composition in any aspect provided herein, deposited onto a substrate, such as a porous substrate. Non-limiting examples of porous substrates include tubes/hollow fibers, planar structures, pleated structures, meshes, or any useful shape. As discussed below, the porous substrate may comprise porous polymer, such as porous PEEK (poly(ether ether ketone), metals, such as sintered titanium, nickel, or metal alloys, and ceramics such as alumina, zirconia, silicon nitride, or silicon carbide, or any polymeric, metallic or ceramic substrates as are broadly-known, having sufficient interconnected porosity to allow fluids, such as gasses or liquids, to flow from one side of the substrate to the other. The film is prepared by depositing the reaction mixture comprising the propargyl-terminated monomer, the azide-terminated monomer, and the crosslinker onto the substrate, e.g., the porous substrate, such as a flat sheet, a tube, or other surface, and subsequently curing and drying the ionic polymer composition at a suitable temperature, such as from 50° C. to 170° C., such as at 110° C., for a suitable time period to allow the polymerization and crosslinking reaction to proceed to completion, for example from six to 72 hours, for example 12 or 24 hours. The film can be ion-exchanged, as indicated above.

A variety of structures are contemplated, though a flat membrane or a tube are described herein for illustration. For example, a planar substrate can be manufactured into a pleated structure, for example, multiple planar surfaces (portions) can be joined to form a pleated structure, such as a tubular pleated structure common to many commercially-available filtration devices. Alternately, a pleated substrate structure may be pre-formed, and a film of the ionic polymer composition according to any aspect described herein, is deposited onto the structure by any useful method, and optionally ion-exchanged and/or a porous protective coating is deposited onto the structure. Examples of a porous protective coating includes porous coatings comprising or consisting of PDMS, nylon, poly(sulfone), poly(amide), or alumina, but the protective coating may be the same as the porous substrate or different and/or can be a porous ceramic, a porous polymer, or a porous metal.

Figure 1B:
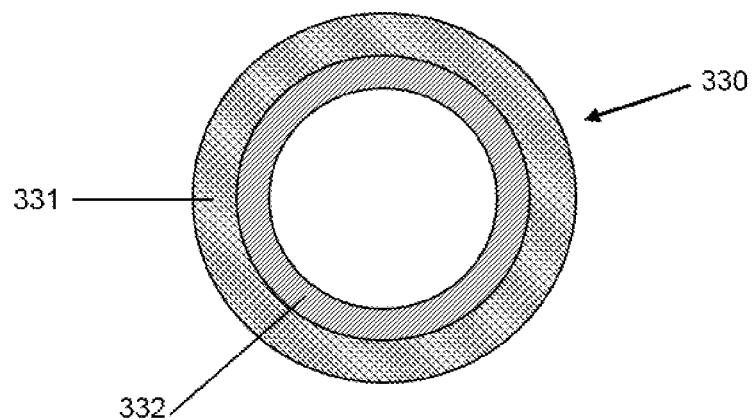
Figure 1C:
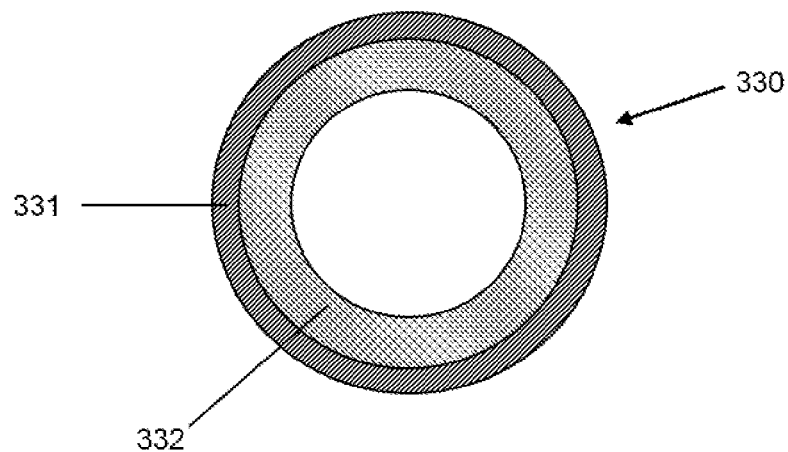

In use as a gas-permeable membrane, the ionic polymer composition is deposited as a film on a porous substrate, and is optionally is ion-exchanged and/or coated with a protective layer as protection against damage and degradation. The protective layer is applied by any useful method, such as by spraying, dipping, or otherwise contacting the membrane with material used to form the protective layer. FIGS. 1A and 1B depict alternate aspects of membrane structures. The structures depicted herein include multiple layers. The layers are depicted in a manner to facilitate the description of the various aspects of the invention, and are not drawn to actual scale. Stating that a layer is deposited onto another layer does not indicate that the layer is deposited directly onto that layer. In other words, unless a layer is said to be deposited directly onto another layer, additional intervening layers may be applied. FIG. 1A depicts a planar membrane 230 with a porous substrate 231 and a selectively-permeable film 232, deposited onto, for example directly onto the porous substrate 232. FIG. 1B depicts a tubular membrane structure 330 with a porous substrate 331 and a film 332 deposited onto, for example directly onto the lumen side of the porous substrate 331. FIG. 1C depicts the reverse orientation as FIG. 1B, in that the film 332 is deposited onto, for example directly onto the exterior of the porous substrate 331.

Figure 2:
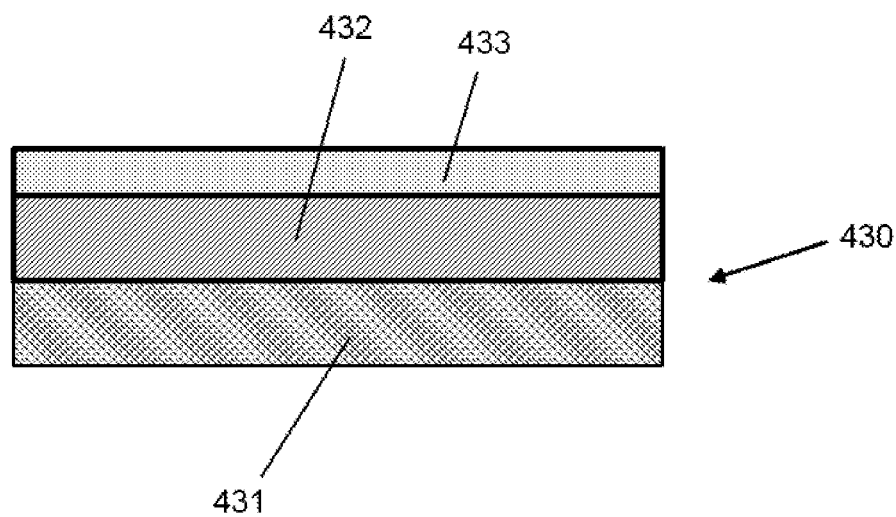
FIG. 2 depicts one aspect of a membrane structure having a protective coating.

FIG. 2 depicts a variation of planar membrane of FIG. 1A. The structure of FIG. 2 can pertain equally to the tubular structures of FIGS. 1B and 1C, or to any topological configuration of the membrane. Specifically, FIG. 2 depicts a planar membrane 430 with a porous substrate 431 and a selectively-permeable film 432, deposited onto, for example deposited directly onto, the porous substrate 432, with a porous protective layer 433 deposited onto, for example directly onto, the selectively-permeable film 432. Porous protective layer 433 can be a second layer of a suitable porous substrate, sandwiching the selectively-permeable film 432 between two layers of a porous substrate 431 and 433. Alternately, the porous protective layer can be a polymeric, ceramic, or other protective layer.

The described porous substrates can be any porous material so long as it is consistent with the selective permeability of the film. The porous substrate can be any shape so long as it permits functionality of the film. Many such substrates are commercially available, such as porous PEEK (poly (ether ether ketone), metals, such as sintered titanium, nickel, or metal alloys, and ceramics such as alumina, zirconia, silicon nitride, or silicon carbide. Additional porous substrates, such as polymeric, metallic or ceramic substrates are broadly-known, having sufficient interconnected porosity to allow fluids, such as gasses or liquids, to flow from one side of the substrate to the other. The porous substrate can also be a mesh, screen, or any other porous structure such as a fabricated polymeric, ceramic or metallic porous structure that allows fluids, such as a gas, to flow through from one side to another. A membrane may be manufactured by any useful method, for instance by depositing, for instance by coating or spraying, a reaction mixture comprising the propargyl-terminated monomer, the azide-terminated monomer, and the crosslinker described herein onto the substrate onto a suitable porous substrate, and heating the structure to from 50° C. to 170° C., optionally in the presence of a copper (e.g., Cu(I)) catalyst for a time sufficient to cause polymerization of the monomers in the reaction mixture.

Although the composition described herein can be formed in a variety of shapes and sizes, for use in $CO_2$-separation, the film is preferably between 50 nm and 1 mm in thickness, and/or has a permeance of from 50 to 300 GPU (gas permeation units, where each unit is equal to $10^4$ Barrer·$cm^{-1}$, $10-6$ $cm·s^{-1}·cmHg^{-1}$, or 7.5005 $m·s^{-1}$ $Pa^{-1}$) and/or a selectivity of from 20-60, e.g., for $CO_2/N_2$, or $CO_2/H_2$, or $CO_2/CH_4$. Of note, "permeance" (PM) is defined as the ratio of the permeability coefficient (P) to the membrane thickness (L). The thinner the membrane the better it performs.

Figure 3:
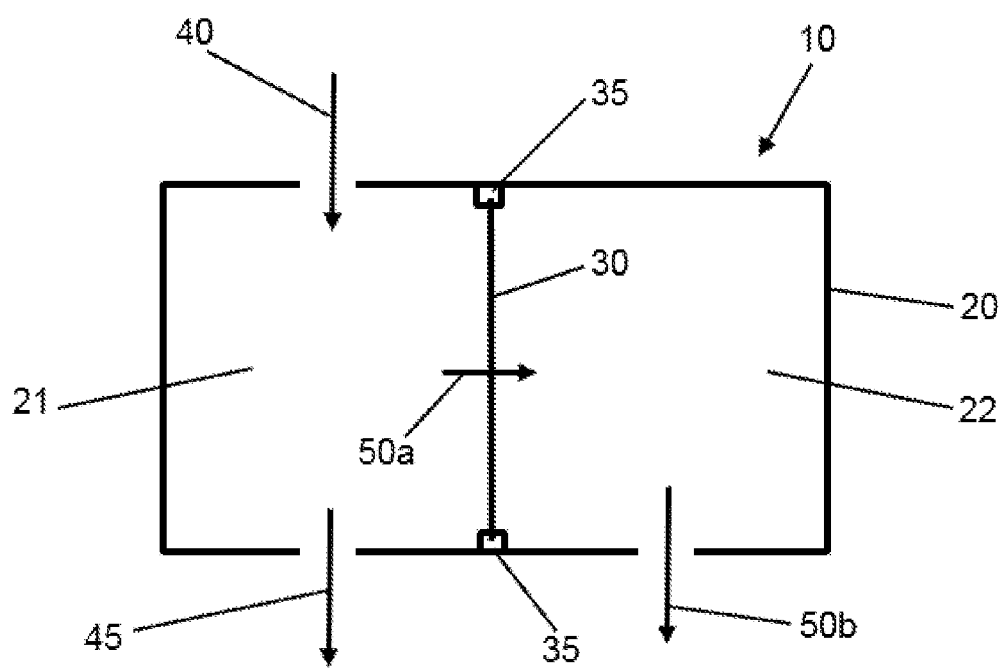
FIG. 3 is a schematic diagram of a two-chamber gas-separation device.

In one aspect, the film according to any embodiment above is used for separation of carbon dioxide from other gasses, such as nitrogen, oxygen, hydrogen and/or volatile organic compounds, such as hydrocarbons, methane or olefins. The film is typically from 50 nm to 2 mm in thickness. FIG. 3 depicts schematically a device 10 for gas separation. The device 10 comprises a manifold 20 comprising a first chamber 21 and a second chamber 22 separated by selectively-permeable membrane 30 comprising one or more layers, including a film comprising an ionic polymer composition as described herein. Examples of membrane structures are depicted, for example, in FIGS. 1A, 1B, 1C and 2. The membrane 30 is kept in place by a retainer 35 or frame, which seals any gaps between walls of the manifold 20 and the membrane 30, producing a gas-tight seal such that only gas passing through the membrane 30 can pass from the first chamber 21 to the second chamber 22 under operating pressures and temperatures. In use, gas 45 enters the first chamber 21 and $CO_2$-depleted gas vents 45 from the first chamber 21 either for further processing or into the atmosphere through an outlet (opening). In certain aspects, gas 45 is combustion gas, e.g., from a furnace or vehicle, or a human or animal respiration product. $CO_2$-enriched gas selectively passes 50a through the membrane 30 and exits 50b the second chamber 22 for storage or further processing. A positive pressure (a pressure greater than ambient, e.g., atmospheric pressure) optionally is created in first chamber 21 by use of a pump (not shown) to force the gas 40 into the first chamber 21, and/or an exit valve or restriction (not shown) to restrict venting of gas 45 from the first chamber 21.

Figure 4A:
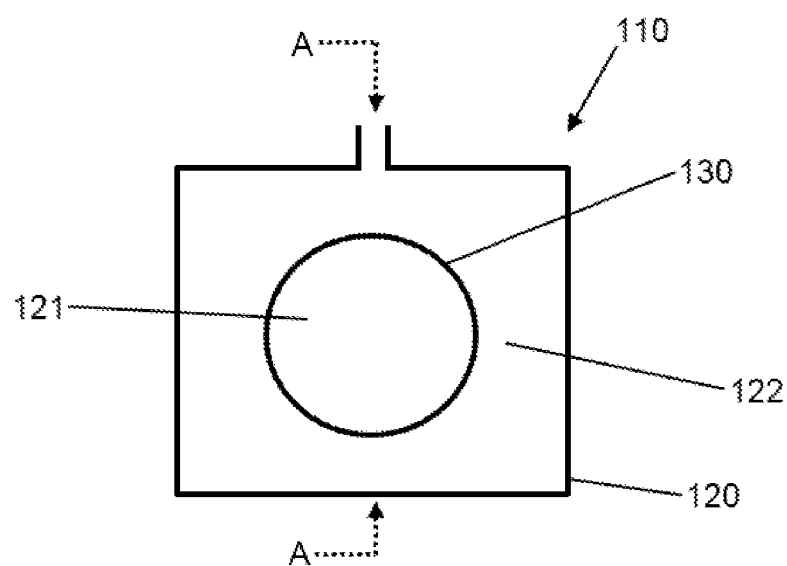
FIGS. 4A and 4B depict one aspect of a gas-separation device.
Figure 4B:
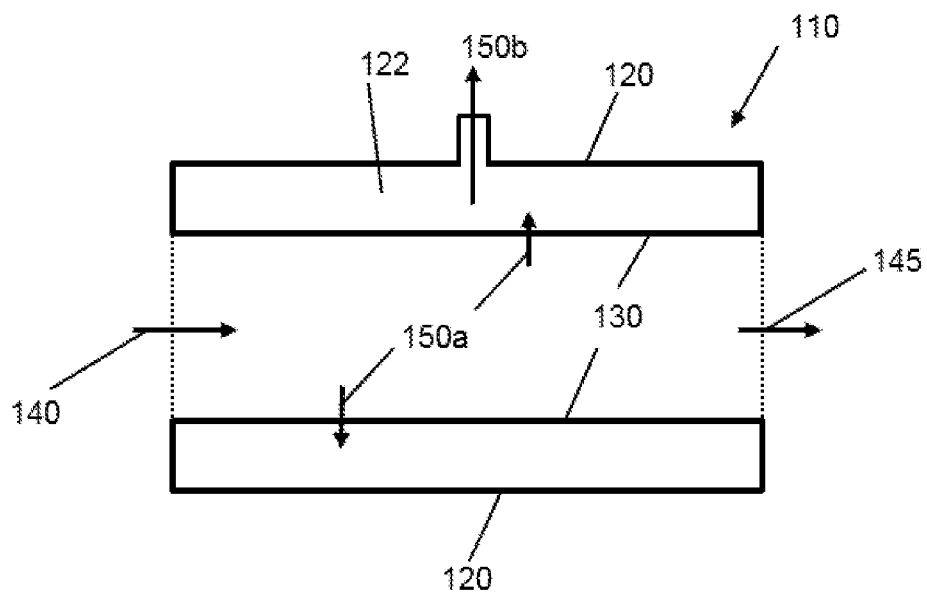
Figure 4C:
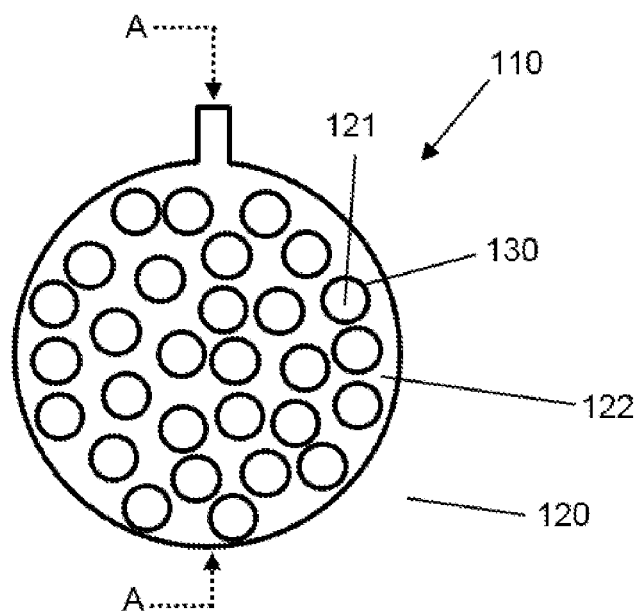
FIGS. 4C and 4D depict one aspect of a gas-separation device.
Figure 4D:
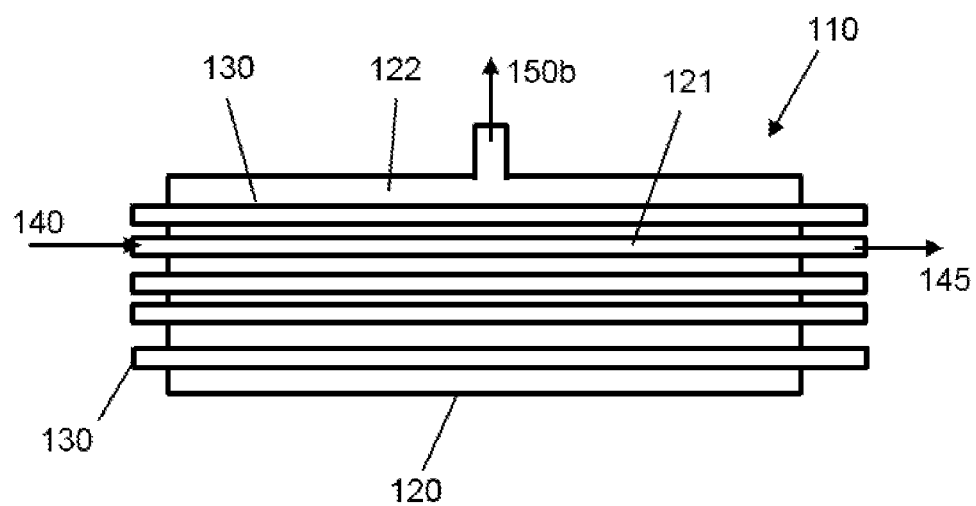

As would be evident to those of ordinary skill in the art, device 10 may be produced in any effective shape and size, and with a membrane 30 of any shape or size, and with a single membrane 30 or a plurality of membranes. For example, as shown schematically in FIGS. 4A and 4B, device 110 comprises manifold 120, having a first chamber 121 and a second chamber 122. Selectively-permeable membrane 130 is a tubular structure such that the first chamber 121 is the lumen of the tube and second chamber 122 is outside the tube, such that gas enters the lumen 140 and $CO_2$ selectively passes 150a through the selectively-permeable membrane 130 to outside the tube, where the $CO_2$-enriched gas exits 150b and $CO_2$-depleted gas remains in the lumen, where it is vented 145. FIGS. 4C and 4D depict a typical hollow-fiber filtration unit structure, essentially based on the unitary tubular structure of FIGS. 4A and 4B. The hollow fiber filtration unit 110 employs a plurality of membranes 130 (tubes or hollow fibers), each having a first chamber 121 (lumen), into which a gas is introduced 140 and through which $CO_2$-depleted gas exits 145. $CO_2$-enriched gas passes through the walls of the membranes 130 and into a common second chamber 122. $CO_2$-enriched gas then exits 150b the unit through an outlet. For clarity, not every tube is labeled in FIGS. 4C and 4D. FIGS. 3 and 4A-4D omit details that one of ordinary skill would apply in the ordinary course for implementing the device 10 and 110, ranging from inlet and outlet structures or venting tubes or connectors, valves, pumps, etc.

Provided herein is a new method to prepare cross-linked, free-standing membranes for $CO_2$ separation and the resulting compositions. Described herein are methods for the synthesis of functionalized oligomers containing but not limited to azide- and propargyl-functional groups, in addition to film fabrication.

EXAMPLE 1

In one embodiment, preparation of cross-linked poly(triazolium) film (4) was achieved as shown in Scheme 1 (FIG. 5). An azide-terminated monomer, 2, and propargyl-terminated monomer, 3, were prepared from commercially available, hydroxyl-terminated PTMEG. Chemical compositions of these monomers were confirmed using $^1H$ NMR, $^{13}C$ NMR, and HRMS. Membrane fabrication is based on thermal polyaddition of azide and propargyl-functionalized monomer in the presence of di-halide quaternizing agent. The resulting free-standing membranes (Polymer 4a-c, whereby a-c is designated as varying samples where the crosslinker (1,10-diiododecane) load increases) are yellow and rubbery. The contact angles of water of these membranes are near 40-50° C. Details are as follows.

Materials and Methods

Materials

Poly(trimethylene ether)glycol (PTMEG, $M_w$=657 g/mol) was provided by DuPont. Methanesulfonyl chloride (MsCl, 99.5%), triethylamine ($Et_3N$, 99%), dichloromethane (DCM, >99.5%), hydrochloric acid (HCl, tracemetal plus), sodium chloride (NaCl, certified ACS), magnesium sulfate (anhydrous, 99.5%), sodium azide ($NaN_3$, laboratory grade), dimethylformamide (DMF, Extra dry, 99.8%), tetrahydrofuran (THF, HPLC grade), sodium hydride (NaH, 95%), propargyl bromide (80 wt % solution in toluene), and 1,10-diiododecane (>98.0%) were purchased from commercial suppliers and used as received.

Characterization Methods $^1H$ (300 MHz) and $^{13}C$ (75 MHz) NMR spectra were recorded at ambient temperature in $CDCl_3$ on a Bruker AVANCE III 300 spectrometer. The high-resolution mass spectrometry analysis (HRMS) was performed using an Agilent 6520 ESI-Q-TOF LC-MS system. A TA instruments Q2000 DSC equipped with liquid nitrogen cooling accessory was used to determine the glass transition temperature. The glass transition temperature was measured using the inflection point of the third heating cycle using a heating and cooling rate of 10° C./min under $N_2$. Thermogravimetric analysis (TGA) was employed to study the thermal stability of polymers using TA instrument model Q500. Samples were heated from 25 to 600° C. at a heating rate of 10° C./min under $N_2$. Dynamic mechanical analysis (DMA) were performed on a TA instrument model Q800 dynamic mechanical analyzer in tension mode at a frequency of 1 Hz, an oscillatory amplitude of 15 μm, and a temperature ramp of 3° C./min over the range from −100 to 150° C./min. Tensile test employed an Instron model 4400 Universal Testing System. The film samples were cut into rectangle shaped specimens (50×5×0.4 mm). Specimens were tested with a cross-head rate of 10 mm/min at ambient conditions using an initial gauge length of 15 mm. The repeated tensile test results were an average value of at least four specimens.

Gas Transport Properties

The pure gas $CO_2$ and $N_2$ permeation tests were performed at room temperature using the isochoric (constant volume, variable-pressure) permeation system. Upstream pressures were measured with a pressure transducer (Maximum pressure 150 psia, viatran Inc., Model-345) and accompanying readout (Dalec electronics digital panel). Downstream pressures were measured using a Baratron® 627D capacitance manometer with a maximum pressure output of 10 Torr (MKS, Wilmington, Mass.). The downstream volume was calibrated by using a standard simple mole balance method with known volume of stainless steel balls. The thicknesses of the membranes were measured using a micrometer (Marathon Electronic digital micrometer) several times and their average value was used for the calculation of permeabiilties. The membrane was loaded in the Millipore high pressure stainless 25 mm filter holder. The entire permeation system was de-gassed using a vacuum pump (Edwards nXDS 10i scroll pump) for 18 hours and then the leak rate was measured by isolating the permeation system from the vacuum pump to obtain the accurate permeability measurements. The leak rate was much less than (at least 10 times) the steady state pressure rise of the gas permeation measurement. The feed gas is then introduced to the upstream side of the membrane, and the pressure rise in the downstream volume was recorded as a function of time. Two film samples were tested to get average permeation results in pure gas studies.

The permeation of a gas through the dense polymer can be described using the sorption-diffusion theory. The permeability of a gas, i, is given by: $P_i = D_i \cdot S_i$, where Di and Si represent the diffusion and solubility coefficients of component i, respectively. In terms of this model, the productivity of a membrane is defined by the permeability of the gas through the membrane and the ideal selectivity of the membrane is the ratio of the permeabilities of the individual gases. Permeability is calculated by taking a differentiation of pressure rise as a function of time and using the following equation:

$$P_A = \frac{V_d \cdot l}{p_2 \cdot A \cdot R \cdot T} \left[ \left(\frac{dp_1}{dt}\right)_{ss} - \left(\frac{dp_1}{dt}\right)_{leak} \right]$$

Where, $V_d$=downstream volume ($cm^3$), l=film thickness (cm), $p_2$=upstream absolute pressure (cmHg), A=film area ($cm^2$), T=Temperature (K), R=gas constant ($cm^3$ cmHg/mol·K), $(dp_1/dt)_{ss}$=rate of pressure rise under upstream pressure (cmHg/sec), $(dp_1/dt)^{leak}$=rate of pressure rise under vacuum (cmHg/sec).

Synthesis Procedures

Synthesis of 1: A solution of MsCl (3.4 g, 0.03 mol) in DCM (10.0 mL) was added dropwise to a mixture of PTMEG (6.5 g, 0.01 mol) and $Et_3N$ (4.2 mL, 0.03 mol) in DCM (10.0 mL) with vigorous stirring at 0° C. After the completion of addition, the mixture was stirred at 0° C. for 2 h and at room temperature for additional 2 h. The mixture was then concentrated to dryness and dissolved in DCM (100 mL). The organic phase was washed with 1M HCl solution (100 mL) and then NaCl saturated solution (100 mL). This procedure was repeated twice. The organic phase was dried over $MgSO_4$ anhydrous overnight and vacuum dried to afford an orange viscous liquid (7.5 g, 93%). $^1$H NMR (300 MHz, $CDCl_3$): δ=4.34 (t, J=6.2, 4H, MsO—$CH_2$—), 3.55-3.46 (m, 40H, —$OCH_2$—), 3.01 (s, 6H, —$SO_2$—$CH_3$), 2.00 (quin, J=6.0, 4H, MsO—$CH_2$—$CH_2$—), 1.83 ppm (quin, J=6.4, 18 H, —$CH_2$—$CH_2$—$CH_2$—). $^{13}$C NMR (75 MHz, $CDCl_3$): δ=68.04-67.34 (20C), 66.04 (2C), 37.19 (2C), 30.10-29.25 ppm (11C).

Synthesis of 2: A mixture of 1 (2.0 g, 0.002 mol) and $NaN_3$ (0.8 g, 0.01 mol) in DMF (10 mL) was heated at 65° C. for 15 h. The mixture was filtered and the solid was washed with THF. The filtrate was concentrated to dryness, washed with $H_2O$ and extracted with DCM. The organic phase was dried over $MgSO_4$ anhydrous overnight and dried under vacuum for 3 h to give a yellow liquid (1.4 g, 80%). $^1$H NMR (300 MHz, $CDCl_3$): δ=3.53-3.47 (m, 40H, —$OCH_2$—), 3.39 (t, J=6.8 Hz, 4H, $N_3$—$CH_2$—), 1.89-1.79 ppm (m, 22H, —$CH_2$—$CH_2$—$CH_2$—). $^{13}$C NMR (75 MHz, $CDCl_3$): δ=79.84 (2C), 74.09 (2C), 67.74-67.06 (22C), 57.99 (2C), 30.01-29.82 ppm (11C). HRMS (ESI): m/z cald for $C_{33}H_{66}N_6O_{10}$+$^H$[M+H]$^+$ 707.4919; found 707.5489.

Synthesis of 3: DMF (10 mL) was added slowly to NaH (0.55 g, 0.02 mol) in a flask under vigorous stirring. 1 (5.0 g, 0.007 mol) was added to the mixture. After 1 h, propargyl bromide (2.3 g, 0.02 mol) was added dropwise over 30 min. After additional 30 min, silica gel and DCM was added to the mixture and allowed stirring overnight. After filtration, the filtrate was washed with $H_2O$ and extracted with DCM. The organic phase was dried over $MgSO_4$ anhydrous overnight and dried under vacuum for 5 h to give a brown liquid (3.2 g, 58%). $^1$H NMR (300 MHz, $CDCl_3$): δ=4.13 (d, J=2.3, 4H, HC≡C—$CH_2$—), 3.59 (t, J=6.2, 4H, —$CH_2$—O—$CH_2$—C≡CH), 3.51-3.45 (m, 40H, —$OCH_2$—), 2.42 (t, J=2.3, 2H, HC≡C—), 1.87-1.78 ppm (m, 22H, —$CH_2$—$CH_2$—$CH_2$—). $^{13}$C NMR (75 MHz, $CDCl_3$): δ=67.90-67.29 (20C), 48.44 (2C), 30.04-29.14 ppm (11C). HRMS (ESI): m/z cald for $C_{39}H_{72}O_{12}$+$Na^+$ [M+Na]$^+$ 755.4922; found 755.4842.

Preparation of Cross-Linked Membranes (4a-c)

A mixture of 2 (1 eq), 3 (1 eq), and 1,10-diiododecane were stirring at room temperature for 1 h. The mixture was dropped on a glass plate and heated in oven to 120° C. for 24 h to yield a yellow free-standing film. The film was washed with $H_2O$/MeOH (1:1) and dried at 110° C. under vacuum overnight.

Results

Thermal Curing Behavior

Figure 6:
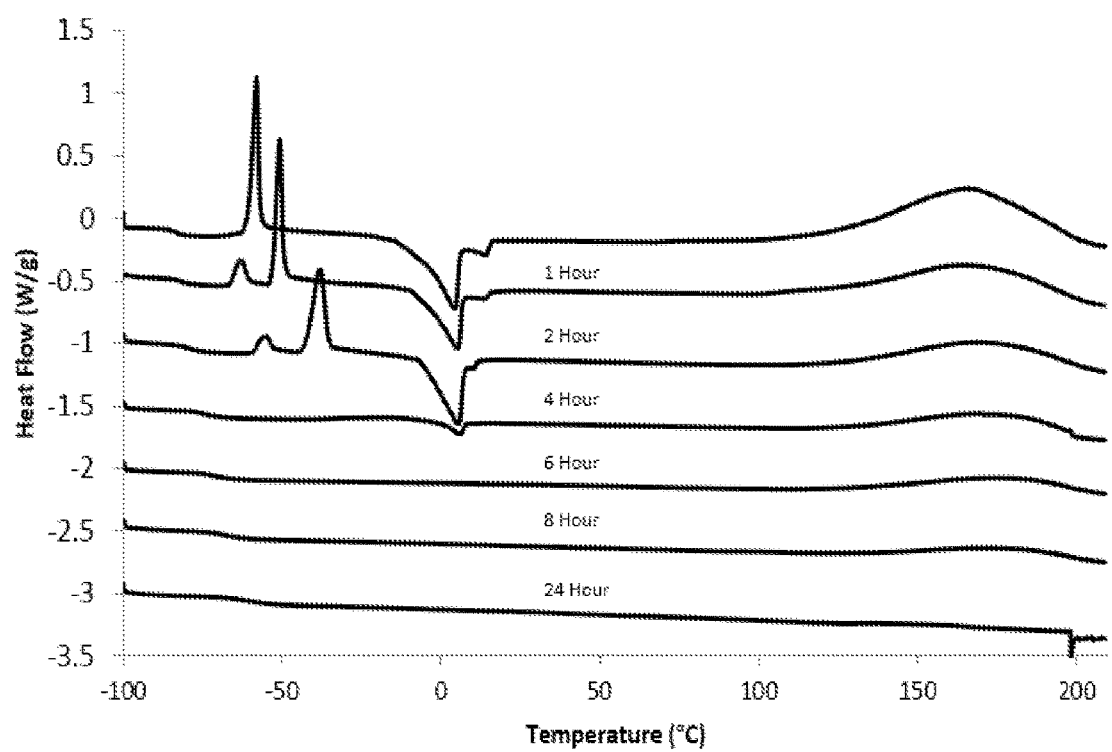
FIG. 6 shows the DSC curves using a 5° C. heating ramp from −100° C. to 210° C. First heat.

The thermal curing behavior of polymer 4b was studied using DSC. DSC capsules containing approximately 5 mg total weight of oligomer 2, 3, and 1,10-diiododecane were sealed under ambient conditions. These DSC capsules were heated at 110° C. in oven for a 1 to 24 hour time period and then quenched with liquid nitrogen to stop the curing process. DSC scans were then run at a ramp of 5° C./min from −100 to 210° C. on all of the samples to see the changes in the heat of reaction and the initial glass transition temperature (Tg0). The DSC curves are shown in FIG. 6. It can be seen in the last DSC curve, 24 hour cure time, the reaction is essentially completed with only a 7 J/g heat of reaction measured. Additionally there appears to be some degradation stating around 200° C., which can be seen in the 4 hour and 24 hour cure curve. Table 1 shows the results of the DSC curves versus curing time at 110° C.

TABLE 1

| DSC results at different curing times at 110° C. | | | |
|---|---|---|---|
| Time, h | $T_{g0}$ ($1^{st}$ heat), ° C. | ΔH, J/g | % conversion f (ΔH) |
| 0 | −83 | 272 | 0% |
| 1 | −83 | 192 | 30% |

TABLE 1-continued

DSC results at different curing times at 110° C.

| Time, h | $T_{g0}$ (1$^{st}$ heat), ° C. | ΔH, J/g | % conversion f (ΔH) |
|---|---|---|---|
| 2 | −80 | 132 | 51% |
| 4 | −76 | 110 | 59% |
| 6 | −72 | 66 | 76% |
| 8 | −69 | 51 | 81% |
| 24 | −62 | 7 | 98% |

To determine the activation energy and the pre-exponential constant of the reaction a Kissinger plot was generated using multiple heating rates (Besset, C., et al., *Macromolecules* 2010, 43, 17-19 and Kissinger, H. E. *Anal. Chem.* 1957, 29, 1702-1706). Kissinger expressed the relation between the heating rate (β) and the peak exotherm ($T_p$) in Equation 1 (Kissinger, H. E. *Anal. Chem.* 1957, 29, 1702-1706).

$$\ln\left(\frac{\beta}{T_p^2}\right) = -\frac{E_a}{RT_p} + \ln\left(\frac{AR}{E_a}\right) \qquad \text{Eq(1)}$$

Figure 7:
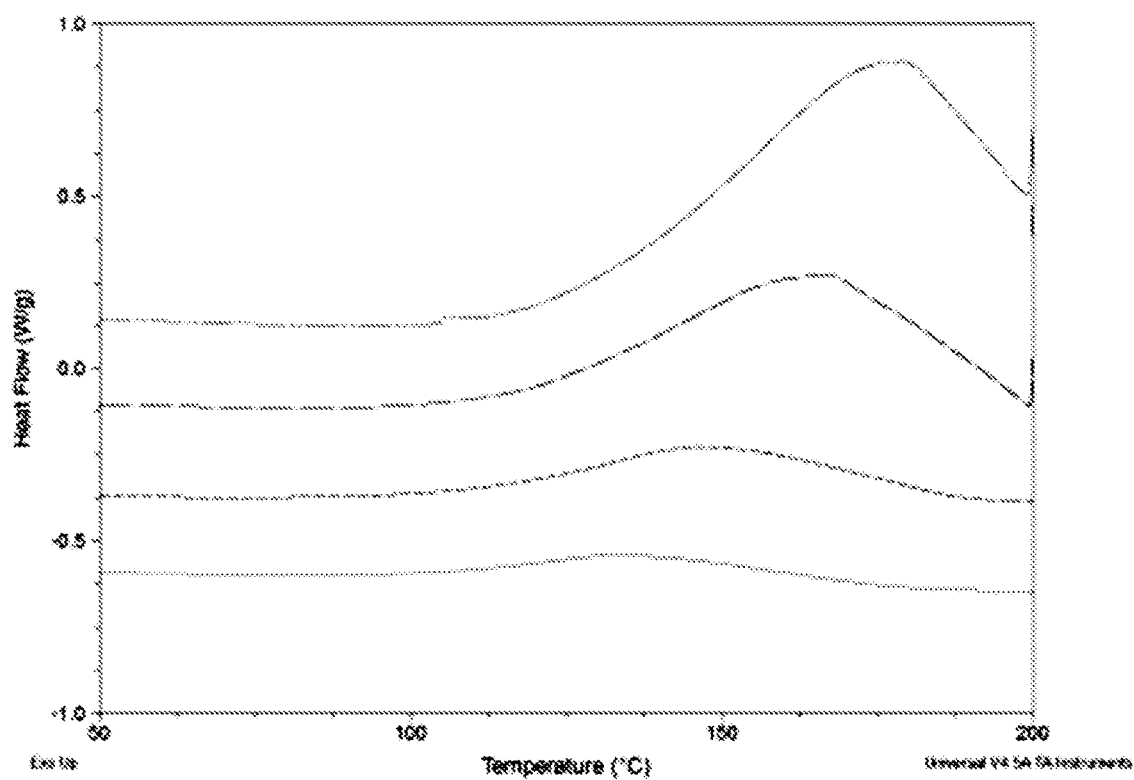
FIG. 7 illustrates the Exotherm peaks versus temperature, ramping temperature.

In Equation 1, β is the heating rate, $E_a$ is the activation energy, A is the pre-exponential factor, R is the gas constant, and $T_p$ is the temperature at the peak of the exotherm. Table 2 is the DSC results for the peak exotherm temperature versus different heating rates. FIG. 7 is a plot of the DSC curves.

TABLE 2

DSC results for different heating rates

| Heating rate, ° C./min | $T_p$, ° C. |
|---|---|
| 1 | 133 |
| 2 | 147 |
| 5 | 165 |
| 10 | 174 |

Figure 8:
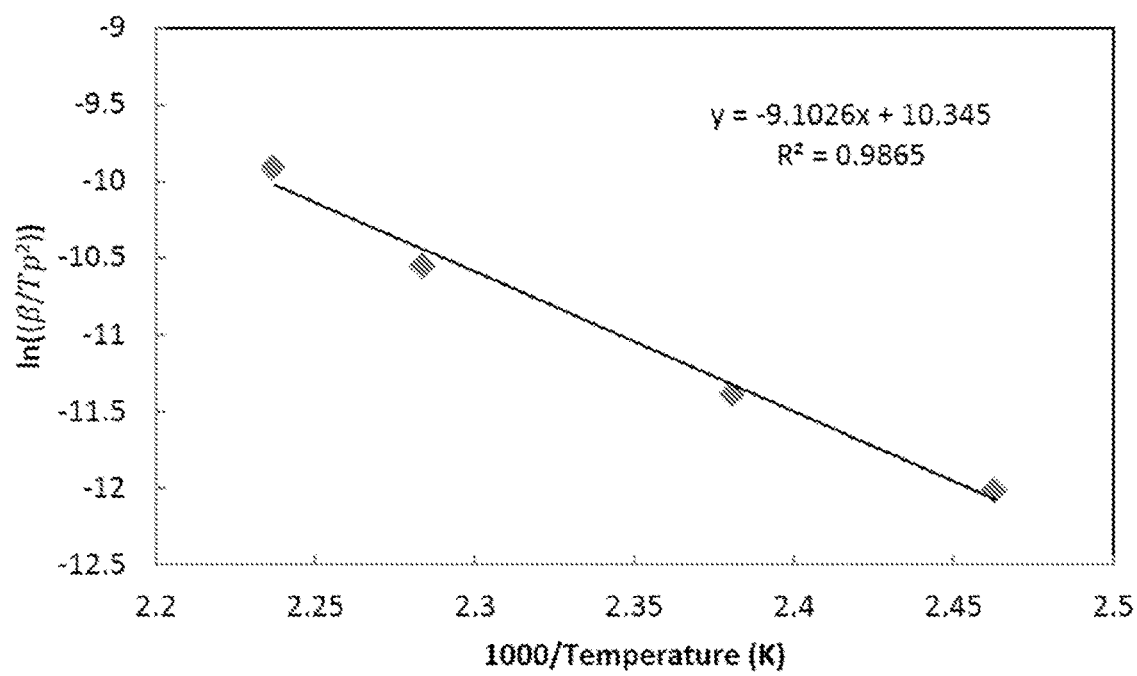
FIG. 8 shows the Kissinger plot of ionically cross-linked poly(ethers).

By plotting $$\ln\left(\frac{\beta}{T_p^2}\right)$$

versus $$\frac{1}{T_p},$$

the result is a straight line seen in FIG. 8. The activation energy is calculated from the slope and the pre-exponential factor is calculated using the intercept. Using this method resulted in an activation energy of 76 KJ/mol and a pre-exponential factor of 2.8×10$^8$. The activation energy determined in our study is close to the literature values (74 and 79 KJ/mol, Besset, C., et al., *Macromolecules* 2010, 43, 17-19) of similar thermal reaction without quaternizing agents. This result indicates that the polyaddition reaction is not affected by the presence of quaternizing agents.

Thermal Properties

Figure 9:
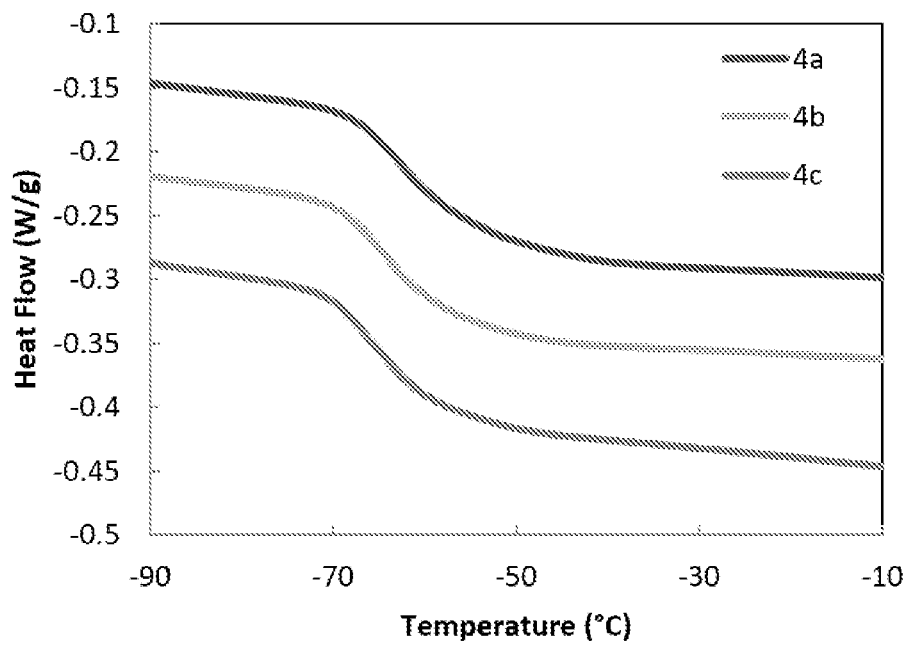
FIG. 9 shows the DSC curves of the third heat of polymer 4a-c.
Figure 10:
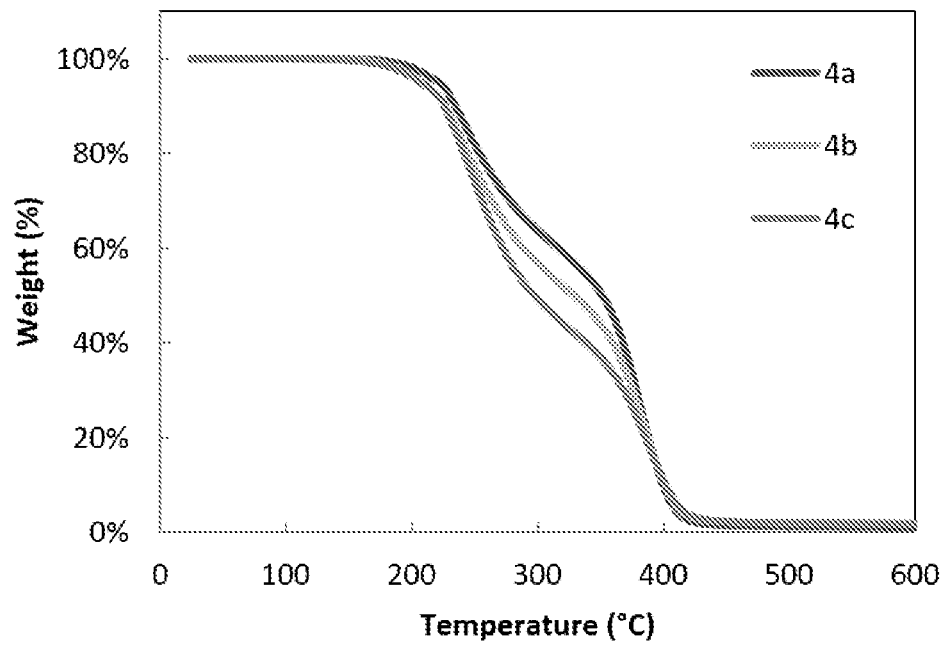
FIG. 10 shows the TGA curves of polymer 4a-c.

Polymer 4a-4c showed single glass transition temperatures ($T_g$s) near −64° C. (Table 3). Crosslinker loading showed insignificant effect on $T_g$s observed from DSC (FIG. 9). TGA curves indicate that these polymers underwent two-stage decomposition. First significant weight loss started at around 230° C. while second weight loss occurred near 350° C. (FIG. 10). The first stage weight loss is likely attributed to the decomposition of iodine moiety in these systems. The amount decomposed in the first stage increases as the crosslinker loading increasing.

Thermomechanical Properties

Figure 11:
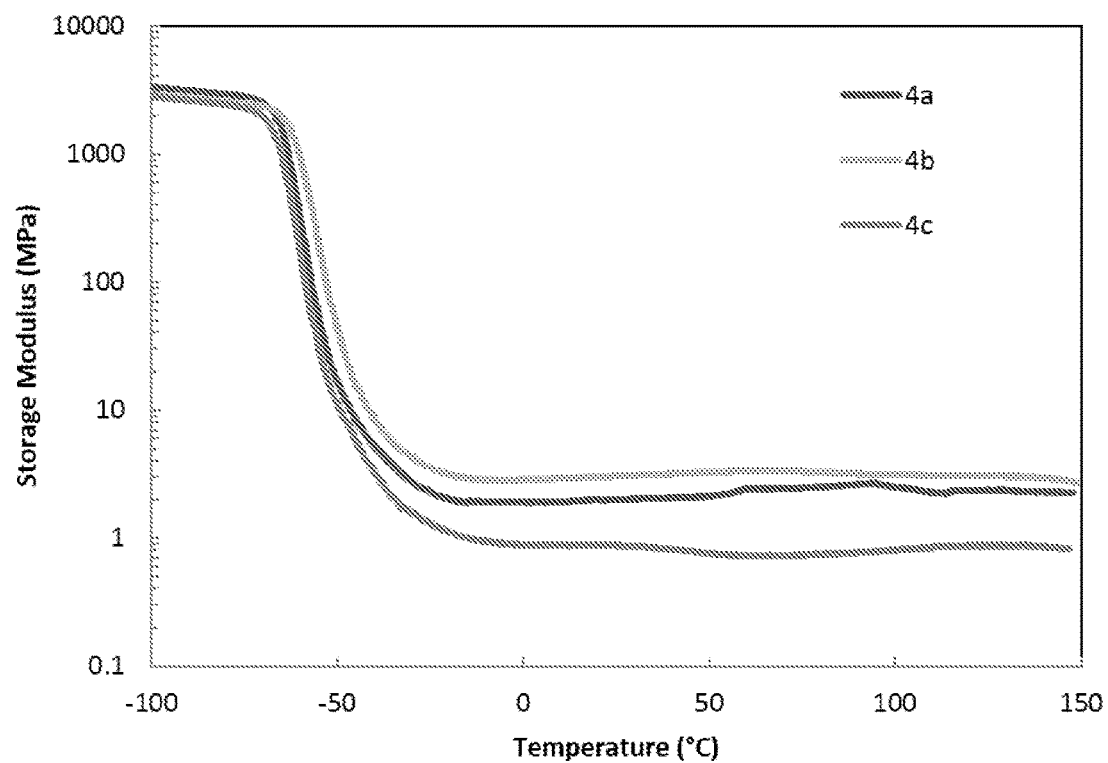
FIG. 11 shows the DMA storage modulus response of polymer 4a-c.

The thermal dynamic mechanical behaviors of polymer 4a-c were studied using DMA. The temperature dependencies of storage modulus for polymer 4a-c are shown in FIG. 11. The lack of observable melting transition at elevated temperature indicates crosslinking characteristics of these membranes.

Figure 12:
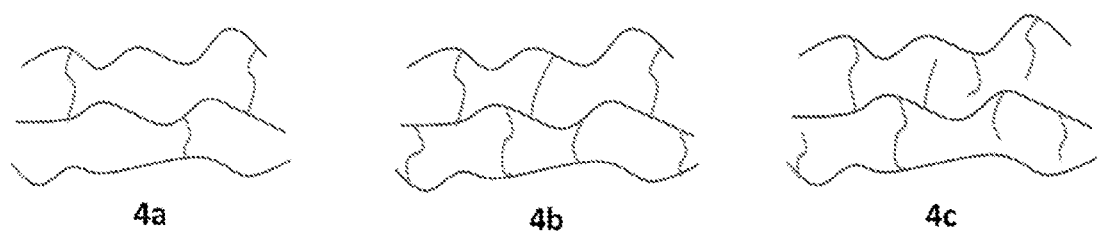
FIG. 12 is an illustration of crosslinking density as an effect of crosslinker loading.

The $T_g$s were determined by the Tan δ peaks (Table 3). They are approximately 10° C. higher compared to the $T_g$s from DSC measurements. From polymer 4a to 4c, as the crosslinker (1,10-diiododecane) loading increasing, $T_g$s from DMA measurement increased and then decreased. This trend is consistent with the trend expected for the crosslinking density of these membranes. FIG. 12 illustrates the crosslinking density as an effect of crosslinker loading. From 4a to 4b, propargyl and azide functionalities are kept in 1:1 ratio while the varying the iodine content. For 4a, since the iodine functionalities are lower than the amount of formed triazoles, crosslinking density is limited by the amount iodine content. For 4b, the theoretic ratio between iodine and triazole is 1:1. The crosslinking density of 4b is higher than 4a since more crosslinkers are available. In the case of 4c, iodine content is much higher than the triazoles. As a result, most of the di-functionalized iodine compounds only reacted on one side and lead to the network with brush structure and low crosslinking density.

TABLE 3

Thermal and gas transport properties of poly(triazolium) 4a-c.

| | Pg:N$_3$:I[a] | Crosslinker loading, wt % | Contact angle of water, ° | $T_{g, DSC}$,[b] ° C. | $T_{g, DMA}$,[c] ° C. | $T_{d5}$,[d] ° C. | Tensile Stress at Break, MPa | Tensile Strain at Break, % | Young's Modulus, MPa |
|---|---|---|---|---|---|---|---|---|---|
| 4a | 1:1:0.5 | 12.1 | 50.9 ± 8.2 | −64 | −55 | 233 | 1.0 ± 0.3 | 76 ± 28 | 2.6 ± 0.5 |
| 4b | 1:1:1 | 21.6 | 54.9 ± 1.3 | −63 | −51 | 222 | 1.3 ± 0.2 | 53 ± 17 | 4.2 ± 0.2 |
| 4c | 1:1:2 | 35.6 | 39.6 ± 3.0 | −65 | −56 | 207 | 0.5 ± 0.2 | 67 ± 23 | 1.5 ± 0.2 |

[a]Mole ratios among propargyl groups, azide groups and iodine groups;
[b]From DSC;
[c]From DMA;
[d]Temperature at 5% weight loss from TGA.

Gas Transport Properties

Figure 13:
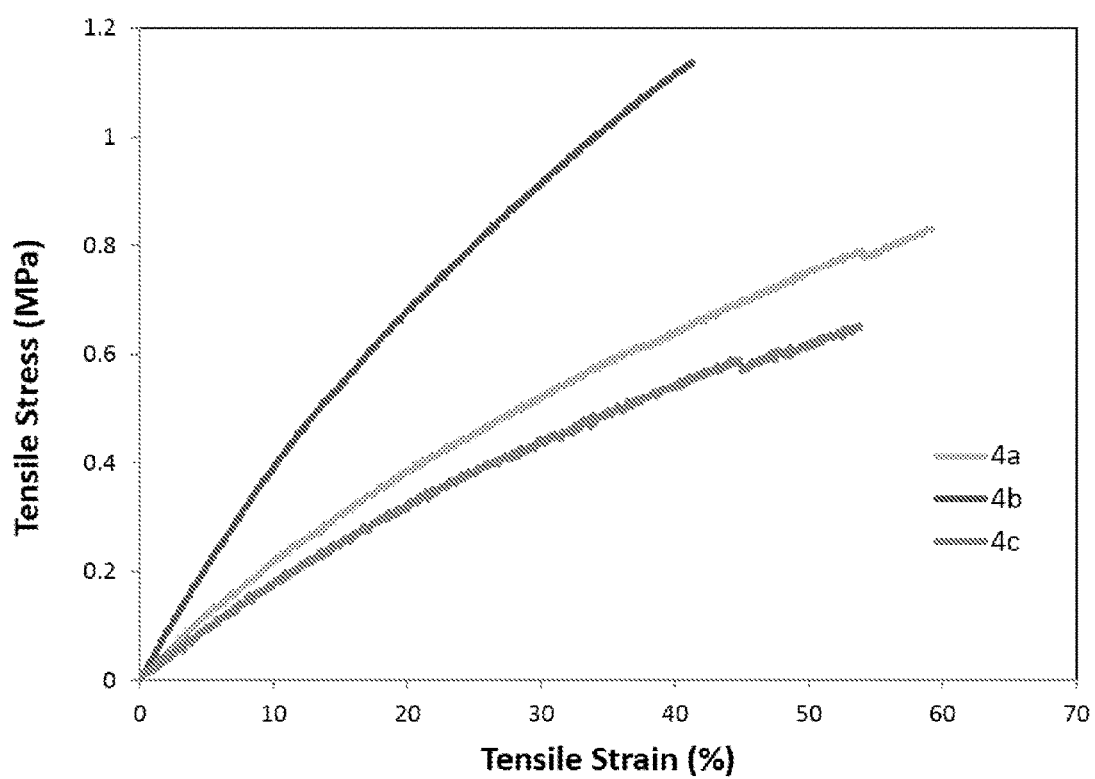
FIG. 13 is a plot of the tensile strain vs stress for polymer 4a-c.

Permeabilities and $CO_2/N_2$ selectivities are summarized in Table 4 and compared with other PILs (FIG. 13). $CO_2$ permeabilities of these membranes are in the range of 85-110 Barrer. Such high permeabilities are mostly attributed to the flexible trimethyl ether backbones. Due to the high content of $CO_2$-philic ether groups, these membranes have $CO_2/N_2$ selectivities ranging from 19 to 41. 4b, which contains the highest crosslinking density, has the lowest $CO_2$ permeability and highest $CO_2/N_2$ selectivity. It is believed that the crosslinking density affects both permeabilities and $CO_2/N_2$ selectivity. Compared to 4a, 4c has slightly lower $CO_2$ permeability but much higher $CO_2/N_2$ selectivity. It is possible that the polymer brushes in 4c enhances in $CO_2/N_2$ selectivity by inhibiting the $N_2$ transportation.

TABLE 4

Gas transport properties of 4a-c.

| | $CO_2$ Permeability, Barrer | $N_2$ Permeability, Barrer | $CO_2/N_2$ Selectivity |
|---|---|---|---|
| 4a | 109.7; 116.7 | 5.7; 6.3 | 19.7; 18.5 |
| 4b | 88.3; 83.6 | 2.1; 2.1 | 42.2; 39.6 |
| 4c | 94.1; 99.0 | 2.5; 2.8 | 37.7; 35.45 |

Membrane properties including hydrophobicity/hydrophilicity, chain rigidity, mechanical properties, gas transport properties, and ionic conductivity are tunable. While maintaining the azide, propargyl and iodo functionalities, other embodiments of the oligomers/crosslinkers can have different backbone/functionalities (such as: PDMS, polysulfones, polyamides, polyimides, poly(ionic liquid)s), chain length, and chain rigidity. Crosslinking density can be controlled by varying the crosslinker content. Furthermore, other embodiments using different anions (such as but not limited to $BF_4^-$, $PF_6^-$, $Tf_2N^-$ (bis(trifluoromethylsulfonyl)imide), and mesylate (methylsulfonyl)) can be incorporated into the system by ion exchanging with $X^-$.

Example applications of the functional membranes described herein include, but are not limited to, $CO_2/N_2$ separation of the flue gas from fossil fuel power plants. Such membranes can be used in other gas separation, such as $CO_2/H_2$, $CO_2/CH_4$. Other potential applications for this membrane include coating, adhesion promotion, soft robotics, drug delivery, and electrochemical applications (e.g. fuel cell, battery). The methods described herein have been demonstrated and described in accordance with several examples, which are intended to be illustrative in all aspects rather than restrictive. Thus, the present invention is capable of many variations in detailed implementation, which may be derived from the description contained herein by a person of ordinary skill in the art.

The following is an outline of various aspects of the invention:

1. A method of making an ionic copolymer composition, comprising:
   a. mixing in a reaction mixture:
      i. a first monomer having the structure C≡C—$CH_2$—R—$CH_2$—C≡C, where R comprises a polyether moiety;
      ii. a second monomer having the structure $N_3$—R'—$N_3$, where R' is the same as, or different from R and comprises a polyether moieties;
      iii. a cross-linker comprising a moiety selected from the group consisting of $C_5$ to $C_{20}$ alkyl, $C_5$ to $C_{20}$ aryl, poly($C_2$-$C_8$ alkylene glycol) with from 1 to 20 ($C_2$-$C_8$ alkylene glycol) residues, and $Si_2$-$Si_{20}$ poly(di-$C_1$-$C_8$ alkyl siloxane), and one or more quaternizing groups; and
      iv. optionally Cu(I) catalyst; and
   b. heating the reaction mixture from 50° C. to 170° C., for at least four hours to form an ionic copolymer composition.

2. The method of paragraph 1, in which the crosslinker has the structure X—$CH_2$—R"—$CH_2$—X', where R" is $C_5$ to $C_{20}$ alkyl, $C_5$ to $C_{20}$ aryl, poly($C_2$-$C_8$ alkylene glycol) with from 1 to 20 ($C_2$-$C_8$ alkylene glycol) residues, or $Si_2$-$Si_{20}$ poly(di-$C_1$-$C_8$ alkyl siloxane), and X and X' are quaternizing groups.

3. The method of either of paragraphs 1 or 2, in which the quaternizing group or groups comprise one or more of the following: chloride; bromide; iodide; sulfonate esters, such as mesylate ($CH_3SO_3$), tosylate (p-toluenesulfonate), triflate ($CF_3SO_3$); carboxyl; sulfonyl; anhydride; and/or dicarbonate groups.

4. The method of paragraph 2, in which R" is $C_5$-$C_{20}$ alkyl, and optionally linear $C_5$-$C_{20}$ alkyl.

5. The method of any of paragraphs 1-4, in which R and R' comprise,

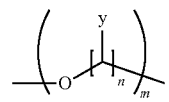

(I)

in which n is 2-8; m is 2-100; and each instance of y is, independently, H, linear alkyl or branched hydrocarbon, and optionally n is 2-6, m is 5-20 and/or each instance of y is, independently, H, linear $C_2$-$C_6$ alkyl or branched $C_2$-$C_6$ alkyl.

6. The method of paragraph 1, in which R and R' are, independently, poly($C_2$-$C_6$ alkylene glycol), having the structure —[R1-O]$_n$—, where R1 is linear or branched $C_2$-$C_6$ alkylene, and n is from 5 to 20.

7. The method of paragraph 1, in which R and R' comprise poly(trimethylene glycol), having the structure —[$CH_2$—$CH_2$—$CH_2$—O]$_n$—, and n is from 5 to 20.

8. The method of paragraph 7, in which the first monomer is C≡C—$CH_2$—O—[$CH_2$—$CH_2$—$CH_2$—O]$_{11}$—$CH_2$—C≡C, the second monomer is $N_3$—[$CH_2$—$CH_2$—$CH_2$—O]$_{10}$—$CH_2$—$CH_2$—$CH_2$—$N_3$, and/or the crosslinker is 1,10-diiododecane.

9. The method of any of paragraphs 1-8, further comprising swelling the ionic copolymer composition in a solvent, such as a polar solvent, and performing ion exchange with an anion.

10. The method of paragraph 9, in which the anion is selected from the group consisting of $OH^-$, phosphate, hexafluoroantimonate, perchlorate, bis[(trifluoromethyl)sulfonyl]amide, nitrite, nitrate, sulfate, a carboxylate, a sulfonate, a sulfonamide, a phosphonate, halides, bis(trifluoromethylsulfonyl)imide, bis(methanesulfonyl)imide, dictanimide, alkylsulfate, alkylsulfonates, saccharinate, triflate acetate, gluconate, docusate, methylsulfate, trifluoroacetate, mono- or diperfluorosulfonate, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$ and amino acid anions.

11. The method of any of paragraphs 1-10, further comprising depositing the reaction mixture onto a porous substrate prior to the heating step.

12. The method of paragraph 11, in which the porous substrate comprises a tube or planar portion, and an amount of the reaction mixture is deposited to form a film of from 50 nm to 2 mm in thickness once the ionic copolymer composition is formed.
13. The method of paragraph 11, in which a porous protective layer or a second porous substrate is deposited onto the layer of the ionic copolymer composition.
14. An ionic copolymer composition comprising poly($C_2$-$C_8$ alkylene glycol) moieties comprising from 2 to 100, optionally from 5 to 20, contiguous alkylene glycol residues, covalently attached to triazolium moieties, and a crosslinker attached to one or more of the triazolium moieties, the crosslinker comprising or consisting of one of a $C_5$ to $C_{20}$ alkyl, $C_5$ to $C_{20}$ aryl, poly($C_2$-$C_8$ alkylene glycol) with from 1 to 20 ($C_2$-$C_8$ alkylene glycol) residues, or $Si_2$-$Si_{20}$ poly(di-$C_1$-$C_8$ alkyl siloxane) moiety, optionally attached to the triazolium moiety by a $CH_2$.
15. The composition of paragraph 14, in which the poly(alkylene glycol) moieties, the triazolium moieties and the crosslinker moieties are present in a molar ratio of poly(alkylene glycol) moieties:triazolium moieties:crosslinker from 1:1:0.5 to 1:1:2, and optionally 1:1:1.
16. The composition of paragraph 14, comprising the structure:
18. The ionic copolymer composition of paragraph 14, in which the poly($C_2$-$C_8$ alkylene glycol) moieties are one or more poly($C_2$-$C_6$ alkylene glycol) moieties, having the structure —[R1-O]$_n$—, where R1 is linear or branched $C_2$-$C_6$ alkylene, and n is from 5 to 20.
19. The ionic copolymer composition of any one of paragraphs 14-18, in which the polyether moieties comprise from 5 to 20 contiguous trimethylene glycol residues.
20. The ionic copolymer composition of any one of paragraphs 14-18, in which the crosslinker is $C_5$-$C_{20}$ alkyl, optionally linear and optionally a decane moiety.
21. The ionic copolymer composition of any of paragraphs 14-120, formed into a film of from between 50 nm and 2 mm in thickness.
22. An ionic copolymer composition comprising the reaction product of a method of any one of paragraphs 1-13.
23. An article comprising an ionic polymer film of the composition of any of paragraphs 14-21 covering at least a portion of a porous substrate.
24. The article of paragraph 23, further comprising a porous protective coating covering at least a portion of the ionic polymer film, wherein the porous protective coating optionally comprises PDMS, nylon, poly(sulfone), poly(amide), or alumina.

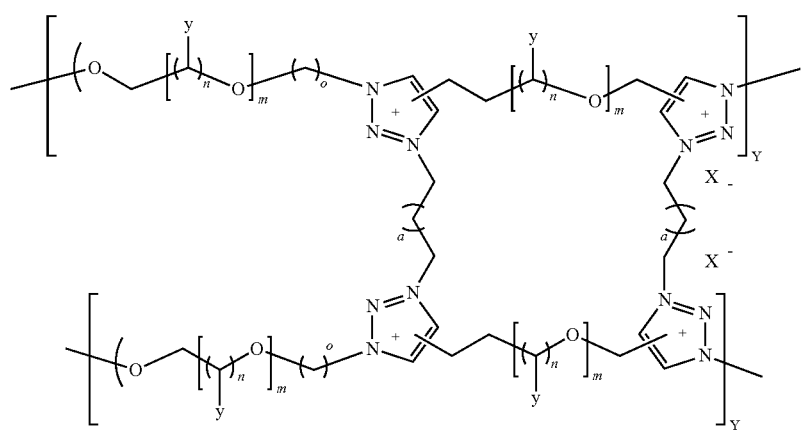

(II)

in which:
a comprises or consists of $C_5$ to $C_{20}$ alkyl, $C_5$ to $C_{20}$ aryl, poly($C_2$-$C_8$ alkylene glycol), such as poly(ethylene glycol), with from 1 to 20 ($C_2$-$C_8$ alkylene glycol) residues, or $Si_2$-$Si_{20}$ poly(di-$C_1$-$C_8$ alkyl siloxane);
n is 2-8;
m is 2-100;
o is $C_2$-$C_6$ alkylene;
each instance of y is, independently, H, linear alkyl or branched hydrocarbon, e.g., alkyl; and
$X^-$ is an anion.
17. The composition of paragraph 16, in which $X^-$ is one or more of the following anions: chloride; bromide; iodide; sulfonate esters, such as mesylate ($CH_3SO_3^-$), tosylate (p-toluenesulfonate), triflate ($CF_3SO_3^-$); carboxyl; sulfonyl; anhydride; dicarbonate anions; $OH^-$, phosphate, hexafluoroantimonate, perchlorate, bis[(trifluoromethyl)sulfonyl]amide, nitrite, nitrate, sulfate, a carboxylate, a sulfonate, a sulfonamide, a phosphonate, halides, bis(trifluoromethylsulfonyl)imide, bis(methanesulfonyl)imide, dictanimide, alkylsulfate, alkylsulfonates, saccharinate, triflate acetate, gluconate, docusate, methylsulfate, trifluoroacetate, mono- or diperfluorosulfonate, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^+$, $SF_5CHFCF_2SO_3$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, and amino acid anions.

25. The article of paragraph 23, in which the porous protective coating is the same material as the porous substrate.
26. The article of paragraph 23, in which the film has a permeance of from 50 to 300 GPU and/or a selectivity 20-60 for $CO_2$ in a mixture of $CO_2$ and one of hydrogen, nitrogen, oxygen, a hydrocarbon, methane or an olefin, and optionally a mixture of $CO_2$ and nitrogen.
27. A device for use in removing carbon dioxide from a gaseous mixture comprising a first chamber comprising a gas inlet and a gas outlet, a second chamber, having a gas outlet and separated from the first chamber by a membrane comprising a film of an ionic polymer composition according to any one of paragraphs 14-21.
28. The device of paragraph 27, in which the film is supported by a porous substrate, optionally the porous substrate is a porous polymer, ceramic or metallic material, or any combination thereof.
29. The device of paragraph 27, in which the film is from 50 nm to 2 mm in thickness.
30. A method of removing carbon dioxide from a gaseous mixture comprising carbon dioxide, comprising introducing the gaseous mixture into a gas inlet of a device, the device comprising:
a. a first chamber comprising the gas inlet and a gas outlet;
b. a second chamber having a gas outlet, separated from the first chamber by a membrane comprising a film of an ionic copolymer according to any one of paragraphs 11-18, and optionally the film has a thickness of from 50 nm to 2 mm,
wherein a carbon dioxide-enriched portion of the gaseous mixture selectively passes through the film into the second chamber and exits the second chamber through the gas outlet of the second chamber, and carbon dioxide-depleted gas exits the first chamber through the gas outlet of the first chamber.

31. The method of paragraph 30, in which the gaseous mixture is a combustion product or a respiration product.
32. Use of the composition of any one of paragraphs 14-21 in an ion conducting network or in a gas-separation device.

Having described this invention, it will be understood to those of ordinary skill in the art that the same can be performed within a wide and equivalent range of conditions, formulations and other parameters without affecting the scope of the invention or any embodiment thereof.

We claim:

1. A method of making an ionic copolymer composition, comprising:
    a. mixing in a reaction mixture:
       i. a first monomer having the structure C≡C—$CH_2$—R—$CH_2$—C≡C, where R comprises a polyether moiety;
       ii. a second monomer having the structure $N_3$—R'—$N_3$, where R' is the same as, or different from R and comprises a polyether moiety; and
       iii. a cross-linker comprising a moiety selected from the group consisting of $C_5$ to $C_{20}$ alkyl, $C_5$ to $C_{20}$ aryl, poly($C_2$-$C_8$ alkylene glycol) with from 1 to 20 ($C_2$-$C_8$ alkylene glycol) residues, and $Si_2$-$Si_{20}$ poly(di-$C_1$-$C_8$ alkyl siloxane), and two or more quaternizing groups; and
    b. heating the reaction mixture from 50° C. to 170 ° C., for at least four hours to form an ionic copolymer composition.
2. The method of claim 1, in which the crosslinker has the structure X—$CH_2$—R''—$CH_2$—X', where R'' is $C_5$ to $C_{20}$ alkyl, $C_5$ to $C_{20}$ aryl, poly($C_2$-$C_8$ alkylene glycol) with from 1 to 20 ($C_2$-$C_8$ alkylene glycol) residues, or $Si_2$-$Si_{20}$ poly(di-$C_1$-$C_8$ alkyl siloxane), and X and X' are quaternizing groups.
3. The method of claim 2, in which R'' is $C_5$-$C_{20}$ alkyl.
4. The method of claim 1, in which R and R' comprise,

in which n is 2-8; m is 2-100; and each instance of y is, independently, H, linear alkyl or branched hydrocarbon.

5. The method of claim 1, in which R and R' are, independently, poly($C_2$-$C_6$ alkylene glycol), having the structure —[R1-O]$_n$—, where R1 is linear or branched $C_2$-$C_6$ alkylene, and n is from 5 to 20.
6. The method of claim 1, in which R and R' comprise poly(trimethylene glycol), having the structure —[$CH_2$—$CH_2$—$CH_2$—O]$_n$—, and n is from 5 to 20.
7. The method of claim 6, in which the first monomer is C≡C—$CH_2$—O—[$CH_2$—$CH_2$—$CH_2$—O]$_{11}$—$CH_2$—C≡C, the second monomer is $N_3$—[$CH_2$—$CH_2$—$CH_2$—O]$_{10}$—$CH_2$—$CH_2$—$CH_2$—$N_3$, and/or the crosslinker is 1,10-diiododecane.
8. The method of claim 1, further comprising swelling the ionic copolymer composition in a solvent and performing ion exchange with an anion.
9. The method of claim 1, further comprising depositing the reaction mixture onto a porous substrate prior to the heating step.
10. An ionic copolymer composition comprising poly($C_2$-$C_8$ alkylene glycol) moieties comprising from 2 to 100 contiguous alkylene glycol residues, covalently attached to triazolium moieties, and a crosslinker attached to one or more of the triazolium moieties, the crosslinker comprising one of a $C_5$ to $C_{20}$ alkyl, a $C_5$ to $C_{20}$ aryl, a poly($C_2$-$C_8$ alkylene glycol) with from 1 to 20 ($C_2$-$C_8$ alkylene glycol) residues, or a $Si_2$-$Si_{20}$ poly(di-$C_1$-$C_8$ alkyl siloxane) moiety.
11. The composition of claim 10, in which the poly(alkylene glycol) moieties, the triazolium moieties and the crosslinker moieties are present in a molar ratio of poly(alkylene glycol) moieties:triazolium moieties:crosslinker from 1:1:0.5 to 1:1:2.
12. The composition of claim 10, comprising the structure:

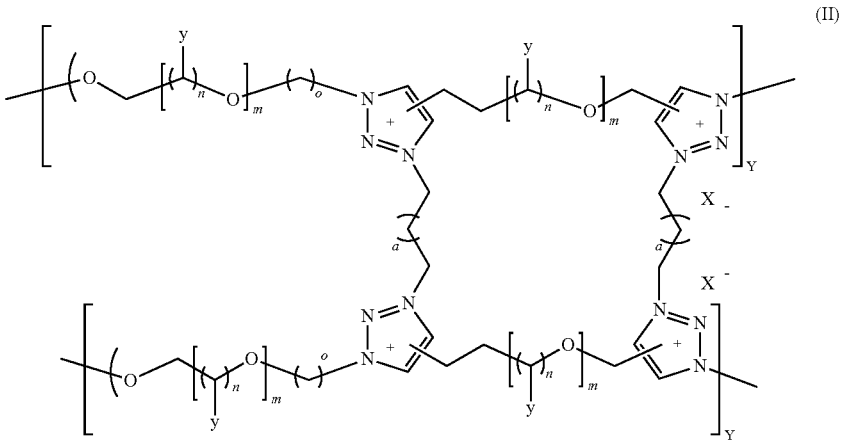

in which:
- a comprises $C_5$ to $C_{20}$ alkyl, $C_5$ to $C_{20}$ aryl, poly($C_2$-$C_8$ alkylene glycol) with from 1 to 20 ($C_2$-$C_8$ alkylene glycol) residues, or $Si_2$-$Si_{20}$ poly(di-$C_1$-$C_8$ alkyl siloxane);
- n is 2-8;
- m is 2-100;
- o is $C_2$-$C_6$ alkylene;
- each instance of y is, independently, H, linear alkyl or branched hydrocarbon; and
- $X^-$ is an anion.

13. The composition of claim 10, in which the poly($C_2$-$C_8$ alkylene glycol) moieties are one or more poly($C_2$-$C_6$ alkylene glycol) moieties, having the structure —[R1—O]$_n$, where R1 is linear or branched $C_2$-$C_6$ alkylene, and n is from 5 to 20.

14. The ionic copolymer composition of claim 10, in which the poly($C_2$-$C_8$ alkylene glycol) moieties comprise from 5 to 20 contiguous trimethylene glycol residues.

15. The ionic copolymer composition of claim 10, formed into a film of from between 50nm and 2mm in thickness.

16. An ionic copolymer composition produced by the method of claim 1.

17. An article comprising an ionic polymer film comprising the composition of claim 10, covering at least a portion of a porous substrate.

18. The article of claim 17, in which the film has a permeance of from 50 to 300GPU and/or a selectivity of from 20 to 60 for $CO_2$ in a mixture of $CO_2$ and one of hydrogen, nitrogen, oxygen, a hydrocarbon, methane or an olefin.

19. A device for use in removing carbon dioxide from a gaseous mixture comprising a first chamber comprising a gas inlet and a gas outlet, a second chamber, having a gas outlet and separated from the first chamber by a membrane comprising a film comprising the ionic copolymer composition of claim 10.

20. A method of removing carbon dioxide from a gaseous mixture comprising carbon dioxide, comprising introducing the gaseous mixture into a gas inlet of a device, the device comprising:
- a. a first chamber comprising the gas inlet and a gas outlet; and
- b. a second chamber having a gas outlet, separated from the first chamber by a membrane comprising a film comprising an ionic copolymer according to claim 10,
- wherein a carbon dioxide-enriched portion of the gaseous mixture selectively passes through the film into the second chamber and exits the second chamber through the gas outlet of the second chamber, and carbon dioxide-depleted gas exits the first chamber through the gas outlet of the first chamber.

21. The method of claim 4, wherein n is 2-6, m is 5-20 or each instance of y is, independently, H, linear $C_2$-$C_6$ alkyl or branched $C_2$-$C_6$ alkyl.

22. The method of claim 8, wherein the solvent is a polar solvent.

23. The method of claim 12, wherein a is poly(ethylene glycol) or each instance of y is, independently, H, linear alkyl, or branched alkyl.

* * * * *

UNITED STATES PATENT AND TRADEMARK OFFICE
CERTIFICATE OF CORRECTION

PATENT NO. : 10,300,438 B2
APPLICATION NO. : 15/520962
DATED : May 28, 2019
INVENTOR(S) : Hunaid B. Nulwala et al.

It is certified that error appears in the above-identified patent and that said Letters Patent is hereby corrected as shown below:

In the Specification

Column 1, Line 8, delete "PCT/US2015/057769." and insert -- PCT/US2015/057769, --

In the Claims

Column 21, Line 11, Claim 12, delete "X⁻is" and insert -- X⁻ is --

Column 21, Line 14, Claim 13, delete "–[R–O]$_n$," and insert -- –[R–O]$_{n-}$, --

Column 22, Line 27, Claim 23, delete "method" and insert -- composition --

Signed and Sealed this
Tenth Day of September, 2019

Andrei Iancu
*Director of the United States Patent and Trademark Office*